US012306698B2

(12) United States Patent
Sethi

(10) Patent No.: US 12,306,698 B2
(45) Date of Patent: May 20, 2025

(54) METHOD AND SYSTEM FOR END-TO-END PREDICTION OF UNEXPECTED EVENTS OCCURRED IN A DISASTER RECOVERY SYSTEM

(71) Applicant: Dell Products L.P., Round Rock, TX (US)

(72) Inventor: Parminder Singh Sethi, Ludhiana (IN)

(73) Assignee: DELL PRODUCTS L.P., Round Rock, TX (US)

( * ) Notice: Subject to any disclaimer, the term of this patent is extended or adjusted under 35 U.S.C. 154(b) by 69 days.

(21) Appl. No.: 18/349,269

(22) Filed: Jul. 10, 2023

(65) Prior Publication Data

US 2025/0021415 A1 Jan. 16, 2025

(51) Int. Cl.
*G06F 11/00* (2006.01)
*G06F 11/34* (2006.01)

(52) U.S. Cl.
CPC ........ *G06F 11/004* (2013.01); *G06F 11/3495* (2013.01)

(58) Field of Classification Search
CPC ... G06F 11/004; G06F 11/3495; G06F 11/008
See application file for complete search history.

(56) References Cited

U.S. PATENT DOCUMENTS

| | | | | |
|---|---|---|---|---|
| 8,006,116 | B1 * | 8/2011 | Sobel | G06F 11/0706 714/21 |
| 9,424,152 | B1 * | 8/2016 | Raut | G06F 11/2041 |
| 9,886,338 | B1 * | 2/2018 | Khokhar | G06F 11/34 |
| 2015/0347245 | A1 * | 12/2015 | Andre | G06F 11/203 714/6.3 |
| 2021/0342215 | A1 * | 11/2021 | Chawla | G06F 11/079 |
| 2022/0197762 | A1 * | 6/2022 | Chopra | G06F 11/2025 |
| 2022/0253361 | A1 * | 8/2022 | Chopra | G06F 11/1469 |
| 2023/0315552 | A1 * | 10/2023 | Cacheaux | G06F 11/1451 714/21 |

* cited by examiner

*Primary Examiner* — Philip Guyton
(74) *Attorney, Agent, or Firm* — Chamberlain, Hrdlicka, White, Williams & Aughtry; Aly Z. Dossa

(57) ABSTRACT

A method for managing a disaster recovery module (DRM) includes: obtaining data center (DC) metadata from a DC; obtaining DRM metadata from the DRM; analyzing the DC metadata and the DRM metadata to extract relevant data; making, based on the relevant data and a first device state chain, a first determination that a failure score of the DRM is greater than a first predetermined failure score, in which the first determination indicates that the DRM is unhealthy; making, based on the first determination, the relevant data, and a second device state chain, a second determination that a failure score of the DC is less than a second predetermined failure score, in which the second determination indicates that the DC is healthy; and sending, based on the second determination, a recommendation to an administrator of the DRM to manage the health of the DRM.

20 Claims, 6 Drawing Sheets

System 100

Client Environment (CE) 110

Data Center (DC) 120

Disaster Recovery Module (DRM) 130

Management Module 140

Virtual DRMs 150

Clients 155

Vendor Environment (VE) 170

Network 160

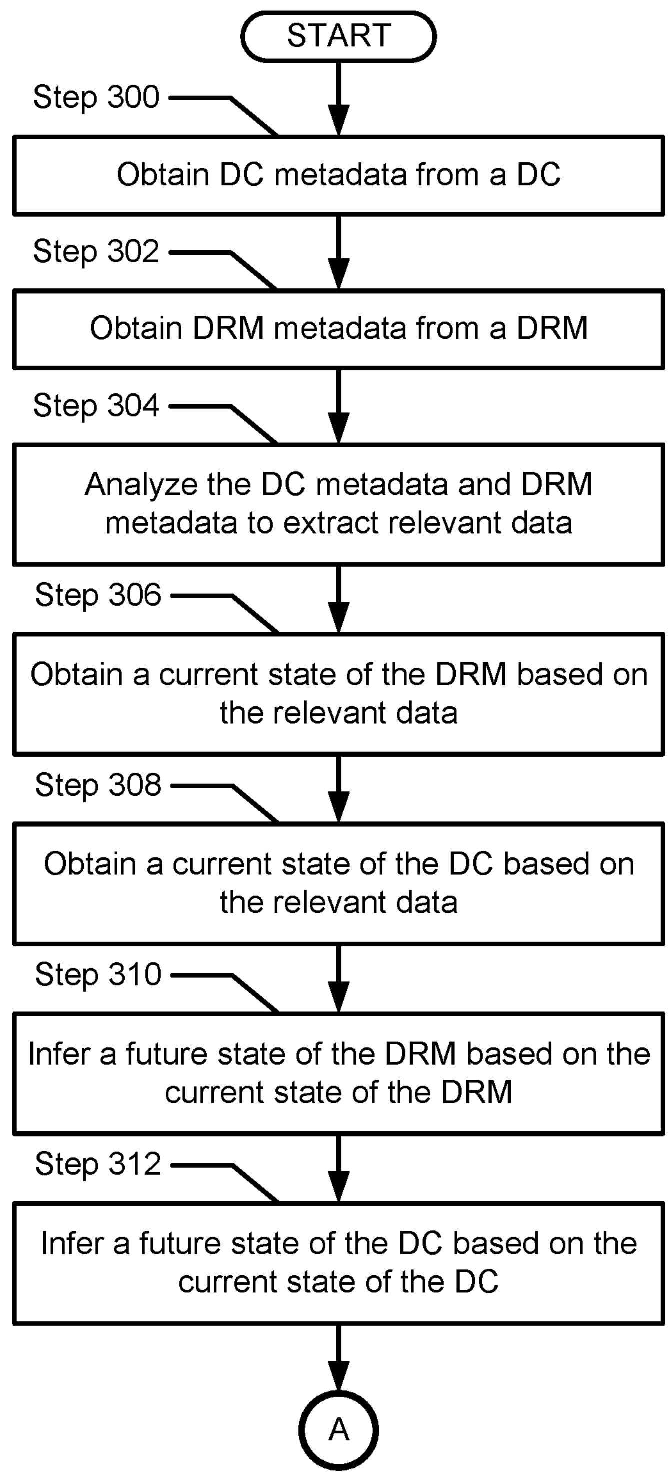
FIG. 3.1

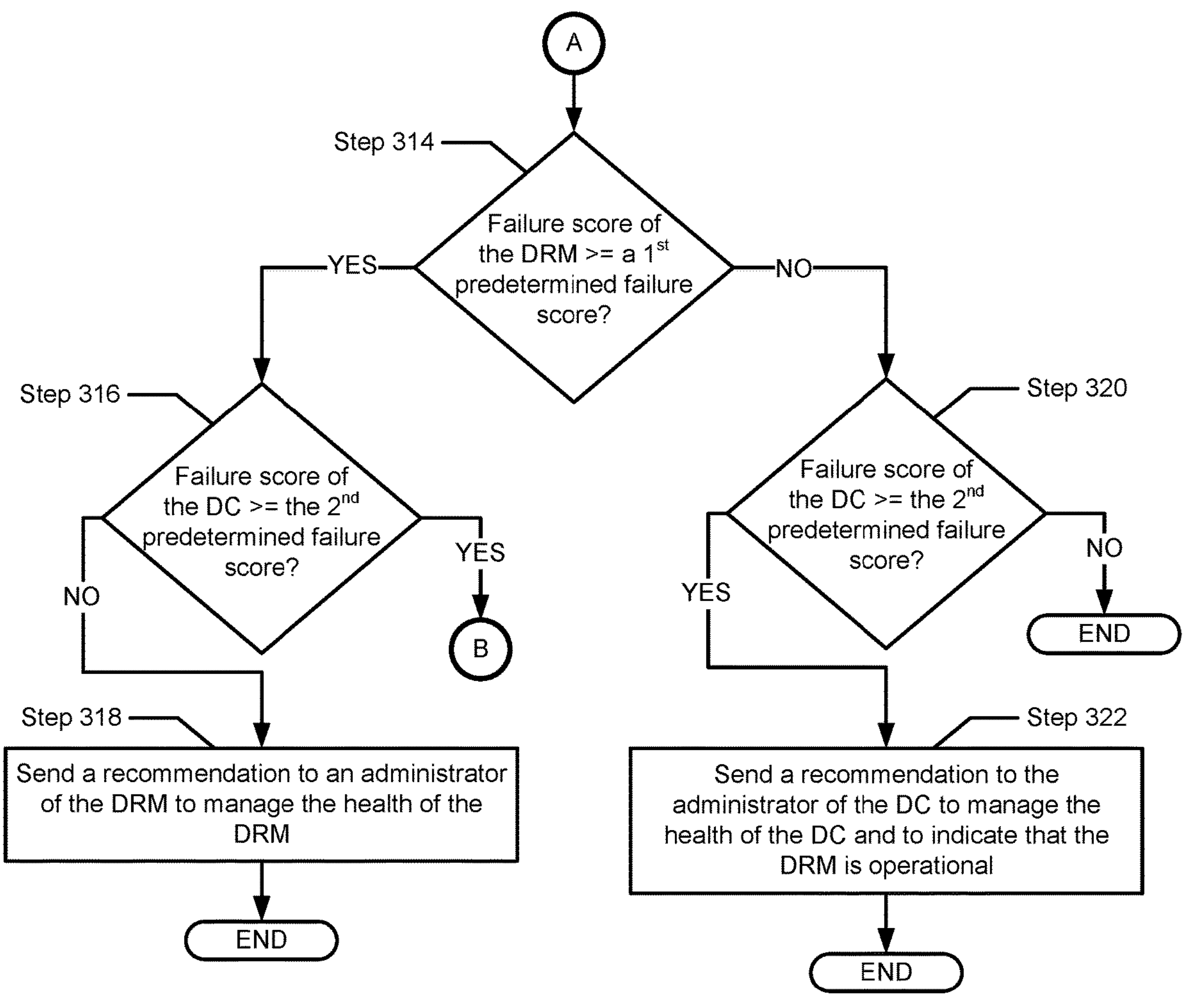
FIG. 3.2

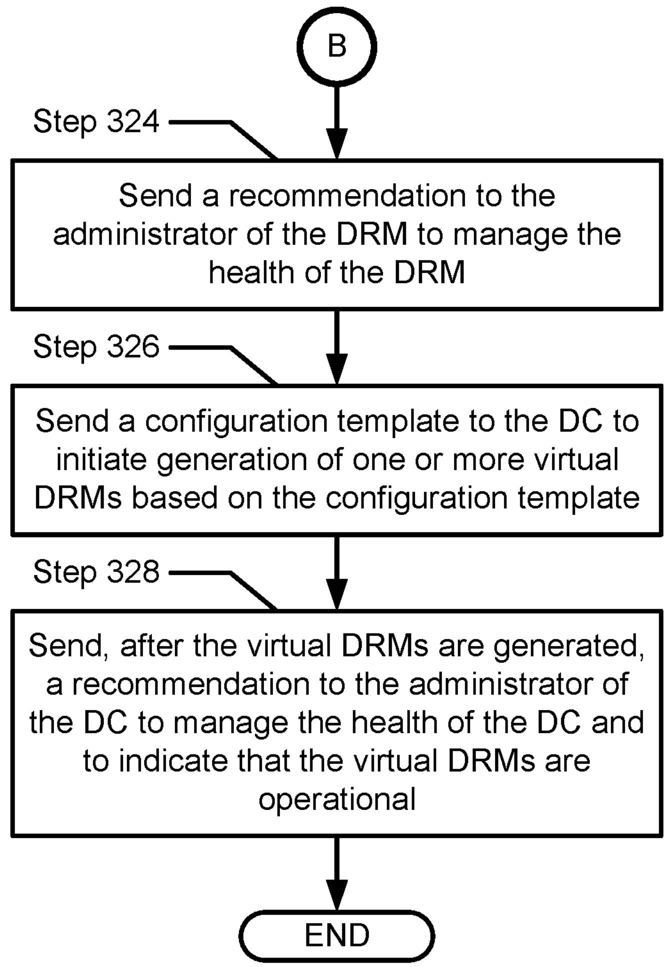
FIG. 3.3

METHOD AND SYSTEM FOR END-TO-END PREDICTION OF UNEXPECTED EVENTS OCCURRED IN A DISASTER RECOVERY SYSTEM

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show a method for managing a disaster recovery module (DRM) in accordance with one or more embodiments of the invention.

DETAILED DESCRIPTION

Figure 1:
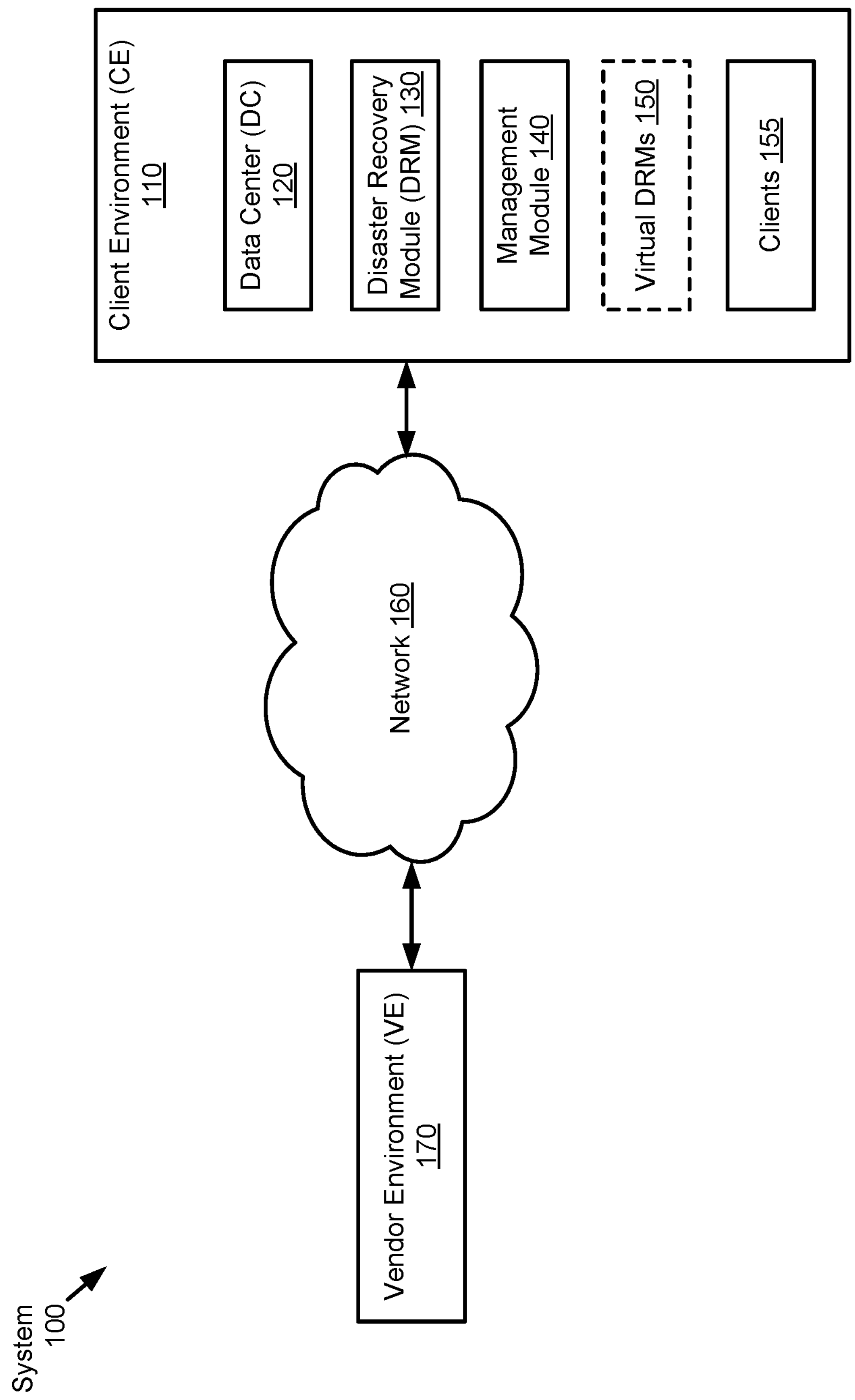
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, data (e.g., digital information) growth (and the resulting complexity) causes continuous challenges in the field of data protection. The so-called data explosion is a reality faced by a majority of large-scale organizations (or companies). One resource has estimated that the total volume of datasphere (where data is being generated) is expected to grow by 175 zettabytes (175ZB) by 2025. In most cases, the datasphere may be thought of as having the following three locations: (i) "core" locations, which include at least traditional and cloud data centers, (ii) "Edge" locations, which include at least remote and branch offices, and (iii) "endpoint" locations, which include at least personal computers, smartphones, and Internet of Things (IoT) devices. Day-by-day, the data (e.g., workloads, mission critical data of those workloads, etc.) continues to spread across all these locations. In response, Information Technology (IT) data centers are adopting various different technologies to handle the data, such as, for example, public, private, and hybrid cloud technologies. There may be various types of, for example, workloads that need to be protected by data protection software (e.g., software capabilities provided by a data protection module) and these workloads may be spread across all these locations.

Organizations are spending significant time and energy (i) to manage these massive amounts of data and (ii) to obtain useful insights (e.g., data protection policies implemented by a user (e.g., a customer), types of workloads protected by those policies, etc.) from one or more data centers (for example, from the ones that are deployed to users) in order to (a) infer how the users are utilizing the data centers and/or (b), if necessary, employ one or more disaster recovery (management) systems (e.g., DRMs) to enable rapid recovery or cloud disaster recovery from cyber incidents (e.g., a data exfiltration event that occurred when a malicious user attempted to transfer a sensitive asset (e.g., a file, a folder, etc.) to an unauthorized removable storage media, a data loss event that occurred when a data theft attempted to upload a sensitive asset to an unauthorized file sharing website using an administrator credential, etc.) (to increase resilience of the data centers). Through the employment of disaster recovery systems (which may operate based on one or more data recovery policies (e.g., a policy that enables data replication (along with computer processing) to a location not affected by a disaster (e.g., a natural disaster, a cyber-attack, etc.) in order to regain access and functionality to a corresponding information technology infrastructure)), for example, even if multiple containers fail, applications executing on the corresponding data center may continue to execute uninterrupted.

In most cases, when an issue (e.g., a hardware issue, a software issue, etc.) is occurred/reported within a data center, the data center may immediately communicate with a DRM and the DRM may provide a backup (associated with the issue) to the data center. However, DRMs may not need to be used for a period of time (e.g., three years, five years, etc.) due to lack of reported issues within data centers. Said another way, after deploying a DRM to a client environment (CE), services of the DRM may not be needed for a period of time.

Further, when a DRM is actually needed (for example, suddenly one of the components (e.g., a hardware component) operating within a data center stops operating and the data center needs the DRM's services to rectify the situation), the DRM may not properly operate (because, for example, the DRM was acting as an isolated system for the last three years) and this may cause catastrophic problems in relation to the data center (and its users). Currently, there is no mechanism/framework to automatically orchestrate the flow of failures (occurred within a data center and/or a DRM), and this issue needs to be resolved.

For at least the reasons discussed above, without requiring resource (e.g., time, engineering, etc.) intensive efforts (i) to extract useful and detailed insights from metadata obtained from a data center and a DRM, (ii) to identify a device profile (e.g., a device state) of a data center and/or a DRM based on the extracted insights, and (iii) to take one or more preventive (and proactive) actions based on the extracted insights, a fundamentally different approach is needed. Embodiments of the invention relate to methods and systems (i) to extract useful and detailed insights from metadata (including metadata obtained from a data center and a DRM), (ii) based on (i), to identify a device state of a data center and/or a DRM, and (iii) based on (i), to take one or more preventive (and proactive) actions. More specifically, the embodiments of the invention may obtain data center (DC) metadata from a DC and may obtain DRM metadata from a DRM. The DC metadata and DRM metadata may be analyzed to extract relevant data. Based on the relevant data and a first device state chain, a first determination may indicate that a failure score of the DRM is greater than a first predetermined failure score. Based on the first determination, relevant data, and a second device state chain, a second determination may indicate that a failure score of the DC is greater than a second predetermined failure score.

Following the second determination, (a) a first recommendation may be sent to a first administrator of the DRM to manage the health of the DRM, (b) a configuration template may be sent to the DC to initiate generation of a virtual DRM based on the configuration template, in which the configuration template may be generated based on a third product configuration information (PCI) (obtained prior to obtaining a second PCI) associated with the DRM when the DRM was operational, and (c) after the virtual DRM is generated, a second recommendation may be sent to a second administrator of the DC to manage the health of the DC, in which the second recommendation may specify that the virtual DRM is operational.

As a result of the processes discussed below, one or more embodiments disclosed herein advantageously ensure that: (i) administrators not need to invest most of their time and engineering efforts to refine metadata, (ii) administrators extract/obtain useful and detailed insights from metadata without the requirement of resource-intensive efforts, (iii) based on the extracted insights, administrators manage potentially problematic future states of DRMs and DCs more effectively for a better product management and development, (iv) based on the extracted insights, administrators identify a user profile of a user more in-depth in order to provide a better user experience to the user, and (v) based on the extracted insights, administrators invest most of their time and engineering efforts to efficiently enhance resilience of the corresponding user environment.

The following describes various embodiments of the invention.

FIG. 1 shows a diagram of a system (100) in accordance with one or more embodiments of the invention. The system (100) includes any number of clients (155), any number of DCs (e.g., 120), any number of DRMs (e.g., 130), a management module (140), if necessary (see FIGS. 3.2 and 3.3), any number of virtual DRMs (150), a network (160), and a vendor environment (VE) (170). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients (155), the DC (120), the DRM (130), the management module (140), and the virtual DRMs (150) may be physical or logical devices, as discussed below. In one or more embodiments, the clients (155), the DC (120), the DRM (130), the management module (140), and the virtual DRMs (150) may collectively be referred to as "components of a CE (110)". Similarly, in one or more embodiments, components (e.g., a data protection module (not shown), a database (not shown), a back-end device (not shown), etc.) of the VE (170) may collectively be referred to as "components of the VE (170)".

While FIG. 1 shows a specific configuration of the system (100), other configurations may be used without departing from the scope of the invention. For example, although the CE (110) and the VE (170) are shown to be operatively connected through a communication network (e.g., 160), the CE (110) and the VE (170) may be directly connected.

Further, functioning of the components of the CE (110) and the components of the VE (170) is not dependent upon the functioning and/or existence of the other components (e.g., devices) in the system (100). Rather, the components of the CE (110) and the components of the VE (170) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver at least computing power (e.g., real-time network monitoring, server virtualization, etc.), storage capacity (e.g., data backup), and data protection (e.g., software-defined data protection, disaster recovery, etc.) as a service to users (e.g., end-users) of the clients (155). The system (100) may also represent a comprehensive middleware layer executing on computing devices (e.g., 400, FIG. 4) that supports virtualized application environments. In one or more embodiments, the system (100) may support one or more virtual machine (VM) environments (e.g., 150), and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide the aforementioned computer-implemented services to the users, the system (100) may perform some computations (e.g., data collection, distributed processing of collected data, etc.) locally (e.g., at the users' site using the clients (155)) and other computations remotely (e.g., away from the users' site using back-end devices at the VE (170)) from the users. By doing so, the users may utilize different computing devices (e.g., 400, FIG. 4) that have different quantities of computing resources (e.g., processing cycles, memory, storage, etc.) while still being afforded a consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, as being implemented as a physical computing device or a logical computing device, the DC (120) (e.g., a site, a node, etc.) may include functionality to, e.g.: (i) provide software-defined data protection, (ii) provide automated data discovery, protection, management, and recovery operations in on-premises, (iii) provide data deduplication, (iv) orchestrate data protection (e.g., centralized data protection, self-service data protection, etc.) through one or more graphical user interfaces (GUIs) (v) empower data owners (e.g., users of the clients (155)) to perform self-service data backup and restore operations from their native applications, (vi) ensure compliance and satisfy different types of service level objectives (SLOs), (vii) enable virtualized and cloud deployments, including automated data discovery, protection, management, and recovery operations for in-cloud workloads, (viii) enable data discovery, protection, management, and recovery operations for cloud-native workloads (e.g., an application that was designed to reside in a cloud environment) across multiple cloud environments, (ix) simplify VM image backups of a VM with near-zero impact on the VM, (x) streamline data protection for applications and/or containers (e.g., Kubernetes® containers), (xi) in conjunction with the DRM (130) or virtual DRMs (150), increase resiliency of an organization by enabling rapid recovery or cloud disaster recovery from cyber incidents, (xii) provide long-term data retention, (xiii) provide dynamic network-attached storage (NAS) backup and recovery, (xiv) provide operational simplicity, agility, and flexibility for physical, virtual, and cloud-native IT environments, (xv) host one or more components (e.g., computing devices) and maintain various workloads for providing a computing environment whereon workloads may be implemented (to provide computer-implemented services), (xvi) support an infrastructure that is based on a network of computing and storage resources that enable the delivery of shared applications and data (e.g., the DC (120) may exchange data with other DCs of the same organization registered in/to the network (160) in order to, for example, participate in a collaborative workload placement; the DC (120) may split up a request (e.g., an operation, a task, an activity, etc.) with another DC, coordinating its efforts to complete the request (e.g., to generate a response) more efficiently than if the DC (120) had been responsible for completing the request; etc.), (xvii) operate as a standalone device, (xviii) consolidate multiple data process or protection requests (received from, for example, the clients (155)) so that duplicative operations (which may not be useful for restoration purposes) are not generated, and (xix) initiate multiple data process or protection operations in parallel (e.g., an engine (of the DC (120)) may host multiple operations, in which each of the multiple operations may (a) manage the initiation of a respective operation and (b) operate concurrently to initiate multiple operations).

In one or more embodiments, the DC (120) may be a heterogeneous set, including different types of hardware components, software components, and/or different types of OSs. One of ordinary skill will appreciate that the DC (120) may perform other functionalities without departing from the scope of the invention.

In one or more embodiments, a GUI may be displayed on a display of a computing device (e.g., 400, FIG. 4) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, the DC (120) may be capable of providing a range of functionalities/services to the users of the clients (155). However, not all of the users may be allowed to receive all of the services. To manage the services provided to the users of the clients (155), a system (e.g., a service manager) in accordance with embodiments of the invention may manage the operation of an internal network, in which the clients (155) are operably connected to the DC (120).

Specifically, the service manager (i) may identify services to be provided by the DC (120) (for example, based on the number of users using the clients (155)) and (ii) may limit communications of the clients (155) to receive DC-provided services. For example, the priority (e.g., the user access level) of a user may be used to determine how to manage computing resources (e.g., of hardware components) within the DC (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a user with a user access level/tier of 4/10). In such a scenario, the user level of that user may indicate that certain ports (of the subcomponents of the internal network corresponding to communication protocols such as transmission control protocol (TCP), user datagram protocol (UDP), etc.) are to be opened, other ports are to be blocked/disabled so that (i) certain services are to be provided to the user by the DC (120) (e.g., while the hardware components of the DC (120) may be capable of providing/performing any number of remote computer-implemented services, they may be limited in providing some of the services over the internal network) and (ii) network traffic from that user is to be afforded a normal level of quality (e.g., a normal processing rate with a limited communication bandwidth (BW)). By doing so, (i) computer-implemented services provided to the users of the clients (155) may be granularly configured without modifying the operation(s) of the clients (155) and (ii) the overhead for managing the services of the clients (155) may be reduced by not requiring modification of the operation(s) of the clients (155) directly.

In contrast, a second user may be determined to be a high priority user (e.g., a user with a user access level of 9/10). In such a case, the user level of that user may indicate that more ports are to be opened than were for the first user so that (i) the hardware components of the DC (120) may provide more services to the second user and (ii) network traffic from that user is to be afforded a high level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a NAS, a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), an application executable or code, an application configuration, a hardware resources configuration, a supporting services configuration, a network connectivity configuration, etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, the term "backup" is intended to be broad in scope. In this manner, example backups in connection with which embodiments of the invention may be employed include (but not limited to): full backups, partial backups, clones, snapshots, incremental backups, differential backups, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the portion of a central processing unit (CPU), memory, and a disk that those processes have access to.

As used herein, "data retention" is a period of time, with a definite start and end, within which the data should be retained in storage (e.g., storage of the CE (110)). For example, a set of user requirements and/or technical considerations (e.g., security considerations, performance considerations, etc.) of the DC (120) may be used to generate a data retention policy specifying that user data should be retained in the storage for six years.

As used herein, a "file system" is a method that an OS (e.g., Microsoft® Windows, Apple® MacOS, etc.) uses to control how data is named, stored, and retrieved. For example, once a user has logged into a computing device (e.g., 400, FIG. 4), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

In one or more embodiments, the DC (120) may host any number of applications (and/or content accessible through the applications) that provide application services to the clients (155). Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute on the DC (120). In one or more embodiments, applications may be logical entities executed using computing resources of the back-end device. For example, applications may be implemented as computer instructions, e.g., computer code, stored on persistent storage of the back-end device that when executed by the processor(s) of the back-end device cause the back-end device to provide the functionality of the applications described throughout the application.

In one or more embodiments, while performing, for example, one or more operations requested by a user of a client of the clients (155), applications installed on the DC (120) may include functionality to request and use resources (e.g., data, computing resources, etc.) of the DC (120). Applications may also perform other types of functionalities not listed above without departing from the scope of the invention. In one or more embodiments, while providing application services to a user, applications may store (temporarily or permanently) data that may be relevant to the user in persistent storage of the DC (120).

In one or more embodiments, the DC (120) may include a hypervisor. The hypervisor may be configured to orchestrate the operation(s) of the virtual DRMs (150) by allocating physical and logical components to the virtual DRMs (150). Thus, the hypervisor may include functionality to, for example (but not limited to): generate or delete a virtual DRM (e.g., the DRM (130) should be restored to a previous state when the DRM (130) was operational (see FIG. 3.3)), allocate or deallocate host resources (i.e., resources of the DC (120)) to support the execution of a virtual DRM and the virtual DRM's respective workloads, manage a communication (e.g., a request from a virtual DRM to a DC component, a request from a DC component to a virtual DRM, etc.) between a virtual DRM and a DC components, etc.

In one or more embodiments, the hypervisor may be a physical device including circuitry, for example (but not limited to): a field-programmable gate array, an application-specific integrated circuit (ASIC), a programmable processor, a microcontroller, a digital signal processor, etc. The physical device may be adapted to provide the functionality of the hypervisor described throughout the application. Alternatively, the hypervisor may be implemented as computer instructions.

In one or more embodiments, in order to provide the above-mentioned functionalities, a component (e.g., a hardware component, a software component, etc.) of the DC (120) may need to communicate with other components of the system (100) with minimum amount of latency (e.g., with high-throughput (e.g., a high data transfer rate) and sub-millisecond (sub-ms) latency). For this reason, representational state transfer application programming interfaces (REST APIs) may be used to enable communication(s) between components of the DC (120) and the other components.

Figure 4:
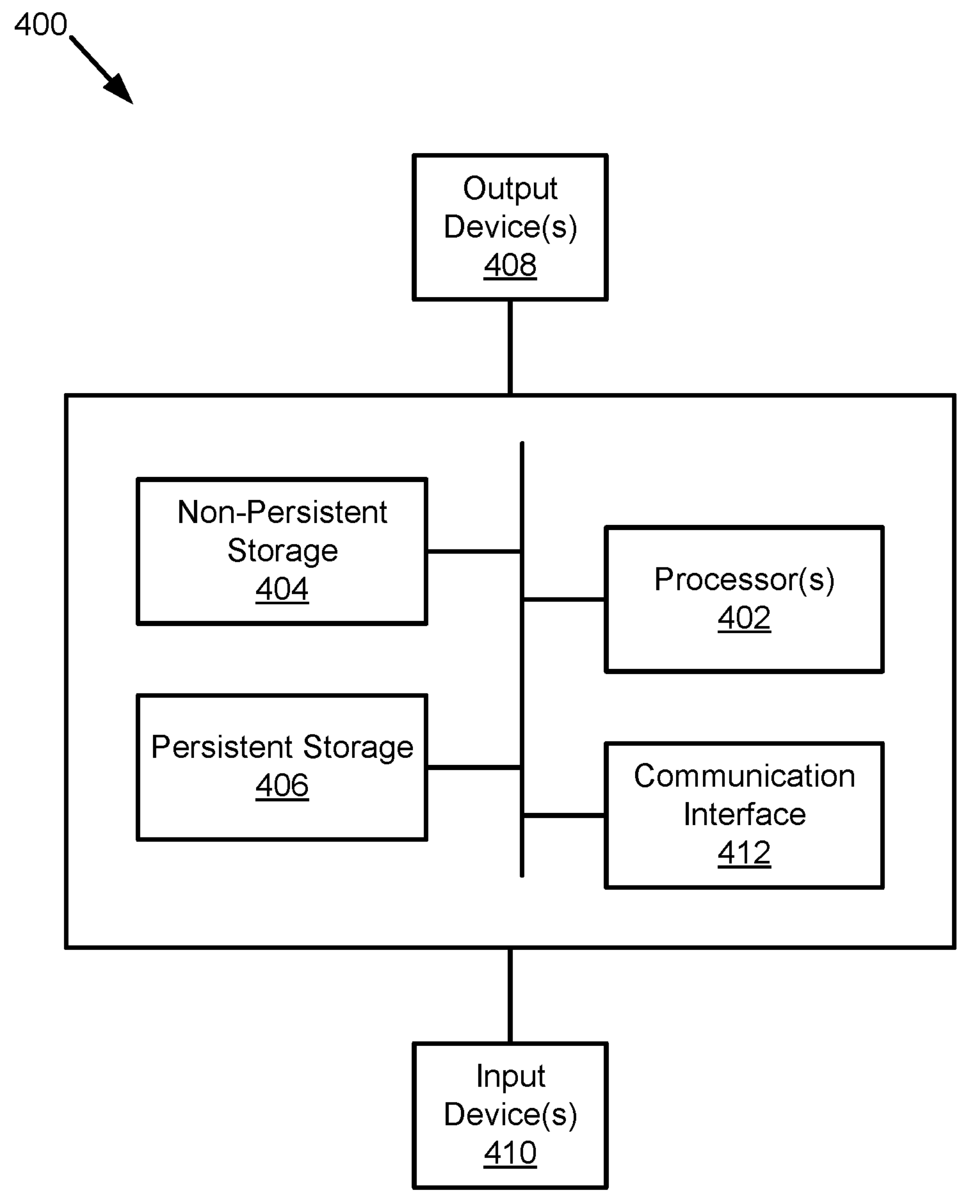
FIG. 4 shows a diagram of a computing device in accordance with one or more embodiments of the invention.

In one or more embodiments, the DC (120) may be implemented as a computing devices (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drive (SSDs), etc.). The computing device may include instructions, stored in the persistent storage, that when executed by the processor(s) of the computing device cause the computing device to perform the functionality of the DC (120) described throughout this application.

Alternatively, in one or more embodiments, the DC (120) may be implemented as a logical device. The logical device may utilize the computing resources of any number of computing devices to provide the functionality of the DC (120) described throughout this application.

In one or more embodiments, the DRM (130) may provide data protection (e.g., data backup, data management, data restore, data recovery, etc.) services to the DC (120) (or any other component of the system (100)). The data protection services may initiate (e.g., instantiate, execute, etc.) generation and storage of backups (e.g., block-based backups, file-based backups, etc.) in CE storage. The data protection services may also include restoration/recovery of the components of the DC (120) (or any other component of the system (100)) to a restoration host (not shown) using the backups stored (temporarily or permanently) in the CE storage.

More specifically, through its production agent (which is configured to locally orchestrate the performance of data protection services/operations), the DRM (130) may provide data protection services to the DC (120) (or any other component of the system (100)) by orchestrating (or scheduling): (i) generation of backups of the DC (120), (ii) storage of the generated backups of the DC (120) in the CE storage, (iii) consolidation of one or more backup and/or recovery requests to reduce (or to prevent) generation of backups that are not useful for restoration purposes, (iv) restoration of the DC (120) to previous states using backups stored in the CE storage, (v) performance of disaster recovery (with this functionality, even if multiple components of the DC (120) fail, applications may continue to execute uninterrupted), and (vi) initiate multiple data protection operations in parallel (for example, the production agent may host multiple operations, in which each of the multiple operations may (a) manage the initiation of a respective operation and (b) operate concurrently to initiate multiple operations).

Further, to provide the aforementioned services, the DRM (130) may include functionality to generate and issue instructions to any other component of the system (100). The DRM (130) may also generate instructions in response to data protection requests from other entities. For example, the production agent may perform a data protection operation under the direction of the DC (120), in which the DC (120) sends instructions to the production agent regarding: (i) when one or more operations should be performed, (ii) where the resulting data backup(s) should be stored (temporarily or permanently), and (iii) when a VM should be restored to a previous state.

In one or more embodiments, the DRM (130) may generate such instructions in accordance with data protection schedules that specify when a protection/recovery needs to be performed. In one or more embodiments, a data protection schedule may lay out specific points in time for a protection to be performed. A data protection schedule may be configured based on a user's RPO.

As used herein, a "user's RPO" is the time between a data loss event and a most recent backup. For example, if a user has a 4-hour RPO for an application, then the maximum gap between a data loss event and the most recent backup will be 4-hours. In most cases, having a 4-hour RPO may not necessarily mean that a corresponding user will lose 4 hours' worth of data. For example, consider a scenario in which a word processing application goes down at 12:35 a.m. and restored by 1:10 a.m. In this scenario, the user may not have much data to lose.

As yet another example, consider a scenario in which a security application goes down at 10:05 a.m. and could not be restored until 1:25 p.m. In this scenario, the user may lose data that is highly valuable to the user. For this reason, the user may set an RPO based on the application priority and may configure the backup schedules accordingly.

In one or more embodiments, the DRM (130) may provide one or more computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more SLAs configured by users of the clients (155)).

In one or more embodiments, in order to provide the above-mentioned functionalities, the DRM (130) may need to communicate with other components of the system (100) with minimum amount of latency. For this reason, REST APIs may be used to enable communication(s) between components of the DRM (130) and the other components. In one or more embodiments, similar to the communication between the clients (155) and the DC (120), the clients (155) may also send a request (e.g., a data protection request) to the DRM (130), and in return, the clients (155) may receive a response (e.g., a response that specifies completion of a database backup in storage) from the DRM (130).

In one or more embodiments, the DRM (130) may support various types of protection targets, depending on the particular use case(s) involved. Such protection targets generally refer to systems, devices, and other computing entities capable of storing data (e.g., backup data). These may be referred to as "protection targets" because they afford protection of data by storing, for example, a copy or clone of that data. In one or more embodiments, protection targets may include, for example (but not limited to): Dell® EMC Data Domain devices (including both physical and virtual devices), Flash storage, private cloud object storage (e.g., Amazon® S3).

In one or more embodiments, each of the example protection targets noted above may have different respective SLAs, performance parameters, latency, and cost. For this reason, if users have specific SLAs for data protection purposes, development of static policies that statically associate protection targets with data protection workloads requires careful evaluation to satisfy the SLA and could adversely impact the ability of satisfying these SLAs if not properly designed.

Further, for example, if a user has various different workload types with different respective SLA requirements, the user may not simply generate a data protection policy and then associate an SLA to these policies, leaving it to the DRM (130) to automatically select a protection target depending on the SLA. Rather, the protection target selection is a time and labor-intensive manual process that requires a careful designing of a backup infrastructure before assigning one or more protection targets.

In one or more embodiments, the DRM (130) may include functionality to provide: (i) temporary and/or permanent data storage services (e.g., storage of the DRM (130) may store backups of the DC (120)) and (ii) copies of previously stored data (e.g., storage of the DRM (130) may provide copies of previously stored backups of the DC (120)). Said another way, the storage of the DRM (130) may be configured to generate and store backups in itself. The storage of the DRM (130) may also be configured to restore data using the backups. One of ordinary skill will appreciate that the DRM (130) may perform other functionalities without departing from the scope of the invention.

Further, one or more snapshots (e.g., user-generated snapshots) may be stored and/or retrieved from the storage of the DRM (130). In one or more embodiments, for example, snapshots may refer to point-in-time copies of user data. For example, Snapshot A may include one or more database objects (discussed below) of user data at a specific point-in-time. As yet another example, Snapshot B may include one or more database objects of the user data at a later point-in-time than the specific point-in-time captured by Snapshot A.

In one or more embodiments, the DC (120) may obtain a status of a data protection operation from the DRM (130). The status of the operation may specify information such as: (i) whether the operation was successful and whether the operation was completed within a predetermined window (e.g., 100% of the operation was completed within the predetermined window), or (ii) whether the operation was unsuccessful and how much of the operation was not completed within the predetermined window (e.g., 70% of the operation was completed and 30% of the operation was not completed). In one or more embodiments, the predetermined window may be a period of time, with a definite start and end, within which a data protection operation is set to be completed.

In one or more embodiments, the DRM (130) may include an operation monitoring service for monitoring a status of a data protection operation. The operation monitoring service may be a computer program that is executed on the underlying hardware of the DRM (130). The operation monitoring service may also be designed and configured to facilitate remote access to check the status of and/or manipulate locally and/or remotely stored data during an operation. Further, the operation monitoring service may include functionality to control remote procedure calls (e.g., API calls) that aims to access and manipulate any granularity of the locally stored data during an operation.

As used herein, an "API call" refers to a process of an application or a computing device submitting a request to an API to retrieve the requested data from an external application or an external computing device.

In one or more embodiments, when an ongoing data protection operation is completed, the DRM (130) may send a notification (e.g., a confirmation notification) to the DC (120) (or to an administrator/user of the DC (120)) regarding the completed operation. In one or more embodiments, the notification (e.g., the alert) may indicate whether the operation was completed within the predetermined window, or whether the operation was completed after exceeding the predetermined window. The notification may be displayed on the GUI of the DC (120). Thereafter, the DRM (130) may notify, via a GUI of a client, a requesting entity (e.g., a user who requested the operation) about completion of the operation.

In one or more embodiments, the DRM (130) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the DRM (130) described throughout the application.

Alternatively, in one or more embodiments, similar to the DC (120), the DRM (130) may also be implemented as a logical device.

In one or more embodiments, as being a physical computing device or a logical computing device (e.g., a VM), the management module (140) may be configured for, at least: (i) hosting and maintaining various workloads and (ii) providing a computing environment (e.g., computing power and storage) whereon workloads may be implemented.

One of ordinary skill will appreciate that the management module (140) may perform other functionalities without departing from the scope of the invention. Examples of the management module (140) may include (but not limited to): an enterprise server, a modular server, a blade server, a mainframe, a workstation computer, etc. In one or more embodiments, the management module (140) may be a heterogeneous set, including different types of hardware components and/or different types of OSs. In one or more embodiments, the management module (140) may be configured to perform all, or a portion, of the functionalities described in FIGS. 3.1-3.3. Additional details about the management module are described below in reference to FIG. 2.

In one or more embodiments, (i) as being a part of the CE (110) and (ii) as being a physical device, a logical intelligence, or a combination thereof (e.g., a computing device that supports virtualized application environments and/or provides virtualized application services), a virtual DRM of the virtual DRMs (150) may provide less, the same, or more functionalities and/or services (described above) comparing to the DRM (130). One of ordinary skill will appreciate that the virtual DRM (150) may perform other functionalities without departing from the scope of the invention.

In one or more embodiments, the virtual DRMs (150) may be logical entities executed using physical and/or logical components of the DC (120), or using computing resources of other computing devices connected to the DC (120). As described above, the hypervisor of the DC (120) may be configured to orchestrate the operation(s) of the virtual DRMs (150) using, for example, virtualization technology. In one or more embodiments, once a virtual DRM is generated (by the DC (120)), the virtual DRM may be used for managing disaster recovery operations for the DC (120) while the DRM (130) is being repaired (e.g., as a replacement for the DRM (130)).

In one or more embodiments, the VE (170) may refer to any party such as manufacturers or distributors of multiple CE components, for example, the DC (120), the DRM (130), the management module (140), etc. In one or more embodiments, the VE (170) may include, at least, a VE agent (not shown) and a VE database (not shown). The VE agent and the VE database may be physical or logical devices.

In one or more embodiments, the VE agent may include functionality to, e.g.: (i) act as an automated continuous integration (CI)/continuous delivery (CD) environment, (ii) act as an integration test environment (e.g., an internal test bed) so that administrators (of the VE (170)) may manage differences between the administrators' product testing activities and users' product utilization activities for product management and development, (iii) enable administrators to manage users' future data growth challenges more effectively, (iv) based on extracted insights (by the management module (140)), enable administrators to manage differences between the administrators' product testing activities and users' product utilization activities (performed by the users of the DC and/or DRM (130)) for more pinpoint product management and development, (v) based on extracted insights, enable administrators to identify a user profile of a user more in-depth in order to provide a better user experience to the user, and (vii) based on extracted insights, enable administrators to invest most of their time and engineering effort to make correct decisions with respect to product investment opportunities.

One of ordinary skill will appreciate that the VE agent may perform other functionalities without departing from the scope of the invention. The VE agent may be implemented using hardware, software, or any combination thereof.

In one or more embodiments, the network (160) (or the "network environment") may represent a computing network and/or fabric configured for computing resource and/or messages exchange among registered computing devices (e.g., the DC (120), components of the VE (170), etc.). As discussed above, components of the system (100) may operatively connect to one another through the network (160) (e.g., a storage area network (SAN), a personal area network (PAN), a local area network (LAN), a metropolitan area network (MAN), a wide area network (WAN), a mobile network, a wireless LAN (WLAN), a virtual private network (VPN), an intranet, the Internet, etc.), which facilitates the communication of signals, data, and/or messages. In one or more embodiments, the network (160) may be implemented using any combination of wired and/or wireless network topologies, and the network (160) may be operably connected to the Internet or other networks. Further, the network (160) may enable interactions between, for example, the DC (120) and the components of the VE (170) through any number and type of wired and/or wireless network protocols (e.g., TCP, UDP, IPv4, etc.). Further, the network (160) may be configured to perform all, or a portion, of the functionality described in FIGS. 3.1-3.3.

The network (160) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network (160), and (iii) limiting communication(s) on a granular level (e.g., on a per-port level, on a per-sending device level, etc.). The network (160) and its subcomponents may be implemented using hardware, software, or any combination thereof.

In one or more embodiments, before communicating data over the network (160), the data may first be broken into smaller batches (e.g., data packets) so that larger size data can be communicated efficiently. For this reason, the network-enabled subcomponents may break data into data packets. The network-enabled subcomponents may then route each data packet in the network (160) to distribute network traffic uniformly.

In one or more embodiments, the network-enabled subcomponents may decide how real-time network traffic and non-real-time network traffic should be managed in the network (160). In one or more embodiments, the real-time network traffic may be high priority (e.g., urgent, immediate, etc.) network traffic. For this reason, data packets of the real-time network traffic may need to be prioritized in the network (160). The real-time network traffic may include data packets related to, for example (but not limited to): videoconferencing, web browsing, voice over Internet Protocol (VoIP), etc.

In one or more embodiments, for example, when the DC (120) communicates with the components of the VE (170) over the network (160), the DC (120) may transmit data structures (e.g., lists, tables, etc.) having a predetermined format in accordance with a communication protocol implemented by the DC (120), the network (160), and/or the components of the VE (170).

Further, as described above, when providing different types of computer-implemented services, the DC (120) may communicate with the clients (155) using different ports (e.g., file transfer protocol (FTP) port 20, network time protocol (NTP) port 123, etc.). Consequently, different functionalities of the services provided by the DC (120) may be dependent on being able to communicate with the clients (155) via different ports. If such communications are made inoperable, then the DC (120) may be prevented from providing functionalities of the services corresponding to the respective ports.

In one or more embodiments, the clients (155) may be physical or logical computing devices configured for hosting one or more workloads, or for providing a computing environment whereon workloads may be implemented. The clients (155) may correspond to computing devices that one or more users use to interact with one or more components of the system (100).

In one or more embodiments, a client may include any number of applications (and/or content accessible through the applications) that provide computer-implemented application services to a user. Applications may be designed and configured to perform one or more functions instantiated by a user of the client. Examples of an application may include (but not limited to): a word processor, a media player, a web browser, a file viewer, an image editor, etc.

In order to provide application services, each application may host similar or different components. The components may be, for example (but not limited to): instances of databases, instances of email servers, etc. Applications may be executed on one or more clients as instances of the application.

In one or more embodiments, applications may vary in different embodiments, but in certain embodiments, applications may be custom developed or commercial applications that a user desires to execute in a client. In one or more embodiments, applications may be logical entities executed using computing resources of a client. For example, applications may be implemented as computer instructions, e.g., computer code, stored on persistent storage of the client that when executed by the processor(s) of the client cause the client to provide the functionality of the applications described throughout the application.

In one or more embodiments, while performing, for example, one or more operations requested by a user, applications installed on a client may include functionality to request and use physical and logical components/resources of the client. Applications may also include functionality to use data stored in storage/memory resources of the client. The applications may perform other types of functionalities not listed above without departing from the scope of the invention. In one or more embodiments, while providing application services to a user, applications may store data that may be relevant to the user in storage/memory resources of a client.

In one or more embodiments, to provide services to the users, the clients (155) may utilize, rely on, or otherwise cooperate with the DC (120). For example, the clients (155) may issue requests to the DC (120) to receive responses and interact with various components of the DC (120). The clients (155) may also request data from and/or send data to the DC (120) (e.g., the clients (155) may transmit information to the DC (120) that allows the DC (120) to perform computations, the results of which are used by the clients (155) to provide services to the users). As yet another example, the clients (155) may utilize application services provided by the DC (120). When the clients (155) interact with the DC (120), data that is relevant to the clients (155) may be stored (temporarily or permanently) in the DC (120).

Figure 2:
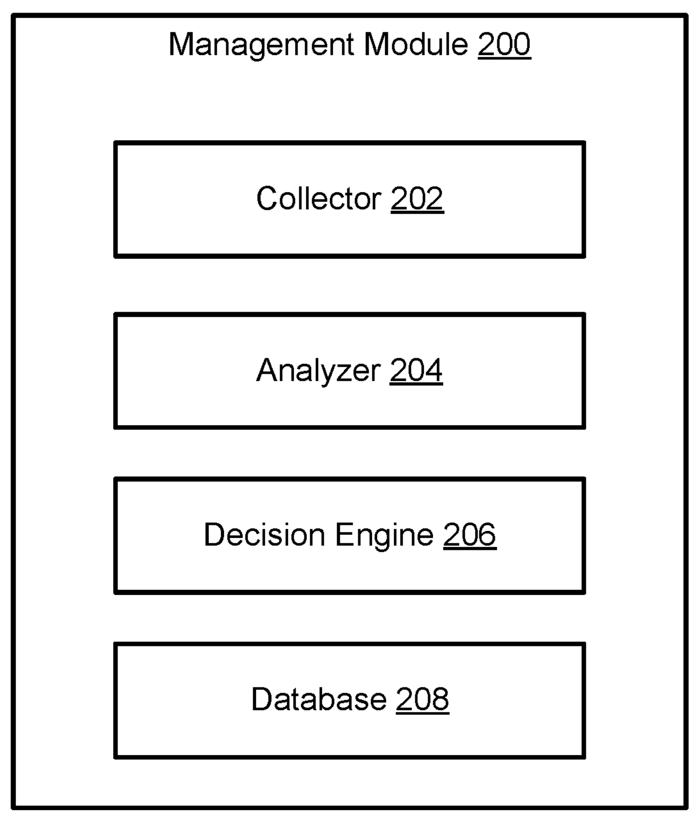
FIG. 2 shows a diagram of a management module in accordance with one or more embodiments of the invention.

As yet another example, consider a scenario in which the DC (120) hosts a database (different from the database (208) shown in FIG. 2) utilized by the clients (155). In this scenario, the database may be a client database associated with users of the clients (155). When a new user is identified, the clients (155) may add information of the new user to the client database. By doing so, data that is relevant to the clients (155) may be stored in the DC (120). This may be done because the clients (155) may desire access to the information of the new user at some point-in-time.

As yet another example, a client of the clients (155) may execute an application that interacts with an application database hosted by the DC (120). When an application upgrade is available to fix a critical software issue, the DC (120) may identify the client that requires the application upgrade. The application database may then provide the application upgrade to the client. By doing so, the application executed by the client may be kept up-to-date. As yet another example, the clients (155) may send instructions to the DC (120) to configure one or more VMs hosted by the DC (120). In one or more embodiments, instructions may be, for example (but not limited to): instructions to configure a backup policy, instructions to take a snapshot of VM data, etc. As yet another example, a client of the clients (155) may initiate an application to execute on the DC (120) such that the application may (itself) gather, transmit, and/or otherwise manipulate data located in the DC (120).

In this manner, the clients (155) may be capable of, e.g.: (i) collecting users' inputs, (ii) correlating collected users' inputs to the computer-implemented services to be provided to the users, (iii) communicating with the DC (155) that perform computations necessary to provide the computer-implemented services, (iv) using the computations performed by the DC (120) to provide the computer-implemented services in a manner that appears (to the users) to be performed locally to the users, and (v) communicating with any virtual desktop (VD) in a virtual desktop infrastructure (VDI) environment (or a virtualized architecture) provided by the DC (120) (using any known protocol in the art), for example, to exchange remote desktop traffic or any other regular protocol traffic (so that, once authenticated, users may remotely access independent VDs (which may accommodate customized settings) via the corresponding client(s)).

As described above, the clients (155) may provide computer-implemented services to users (and/or other computing devices such as, for example, other clients or other types of components). The clients (155) may provide any quantity and any type of computer-implemented services (e.g., data storage services, electronic communication services, etc.). To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphics processing unit (GPU), a data processing unit (DPU), a computation acceleration resource, an ASIC, a digital signal processor for facilitating high speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): an HDD, a solid-state drive (SSD), RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, a client may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the clients (155) provide computer-implemented services to users, the clients (155) may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (155) may enter into agreements (e.g., SLAs) with providers (e.g., the VE (170)) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., other clients, the DC (120), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., TCP, UDP, Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients. For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client to the VM.

In one or more embodiments, the clients (155) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (155) described throughout the application.

Alternatively, in one or more embodiments, similar to the DC (120), the clients (155) may also be implemented as logical devices.

In one or more embodiments, users may interact with (or operate) the clients (155) in order to perform work-related tasks (e.g., production workloads). In one or more embodiments, the accessibility of users to the clients (155) may depend on a regulation set by an administrator of the clients (155). To this end, each user may have a personalized user account that may, for example, grant access to certain data, applications, and computing resources of the clients (155). This may be realized by implementing the "virtualization" technology. In one or more embodiments, an administrator may be a user with permission (e.g., a user that has root-level access) to make changes on the clients (155) that will affect other users of the clients (155).

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a GUI generated by a visualization module (not shown) of the client. In one or more embodiments, the visualization module may be implemented in hardware (e.g., circuitry), software, or any combination thereof.

Turning now to FIG. 2, FIG. 2 shows a diagram of a management module (200) in accordance with one or more embodiments of the invention. The management module (200) may be an example of the management module discussed above in reference to FIG. 1. The management module (200) may include a collector (202), an analyzer (204), a decision engine (206), and a database (208). The management module (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the collector (202) may include functionality to, e.g.: (i) obtain (or receive) DRM metadata (described below) associated with one or more components of the DRM (e.g., 130, FIG. 1) (to infer, for example, a change in the health status of the DRM (e.g., in real-time (e.g., on the order of milliseconds or less)) because of an unexpected event (e.g., fan failure is reported, overheating of CPU is reported, memory module failure is reported, power module failure is reported, a security incident is reported, etc.)), (ii) obtain (or receive) DC metadata (described below) associated with one or more components of the DC (e.g., 120, FIG. 1) (to infer, for example, a change in the health status of the DC (in real-time) because of an unexpected event), (iii) obtain and track (periodically) resource utilization levels (or key performance metrics with respect to, for example, network latency, the number of open ports, OS vulnerability patching, network port open/close integrity, multitenancy related isolation, password policy, system vulnerability, data protection/encryption, data privacy/confidentiality, data integrity, data availability, be able to identify and protect against anticipated and/or non-anticipated security threats/breaches, etc.) regarding the DC (e.g., 120, FIG. 1) and the DRM (e.g., 130, FIG. 1), (iv) monitor performance and/or health of each component of the DC (e.g., 120, FIG. 1) by obtaining (e.g., gathering) telemetry data about each component, (v) monitor performance and/or health of each component of the DRM (e.g., 130, FIG. 1) by obtaining telemetry data about each component, (vi) send the aforementioned data (i.e., collected/obtained information) to the analyzer (204), and (vii) store (temporarily or permanently) the aforementioned data in the database (208).

In one or more embodiments, the aforementioned information (e.g., DRM metadata, DC metadata, resource utilization levels, telemetry data, logs, alerts (e.g., predictive alerts, proactive alerts, technical alerts, etc.) triggered at the corresponding device, etc.) may be obtained as they become available or by the collector (202) polling the corresponding device (e.g., the DRM (e.g., 130, FIG. 1), the DC (e.g., 120, FIG. 1), etc.) (by making an API call to the corresponding device) for new information. Based on receiving the API call from the collector (202), the corresponding device may allow the collector (202) to obtain the information.

In one or more embodiments, alerts may be defined by a vendor of the corresponding device (e.g., the DC (e.g., 120, FIG. 1), the DRM (e.g., 130, FIG. 1), a client of the clients (e.g., 155, FIG. 1), etc.), by an administrator (e.g., of the DC (e.g., 120, FIG. 1), of the DRM (e.g., 130, FIG. 1), etc.), by another entity, or any combination thereof. The alerts may be defined based on a data protection policy.

In one or more embodiments, the aforementioned information may be obtained (e.g., may be dynamically fetched, streamed, etc.) continuously (without affecting production workloads of the corresponding device), as they generated, or they may be obtained in batches, for example, in scenarios where (i) the collector (202) receives a failure score calculation request, (ii) the corresponding device accumulates the information and provides them to the collector (202) at fixed time intervals, or (iii) the corresponding device stores the information in its storage (or in an external entity (e.g., 208)) and notifies the collector (202) to access the information from its storage or from the external entity. In one or more embodiments, the information may be access-protected for the transmission from the corresponding device to the collector (202), e.g., using encryption.

In one or more embodiments, the aforementioned information may include (or may specify), for example (but not limited to): an application log (described below), a system log (described below), a type of an asset (e.g., a type of a workload, such as an SQL database, a NAS executing on-premises, a VM executing on a multi-cloud infrastructure, etc.) utilized by a user, an SLA/SLO set by a user, a product identifier of the DC (e.g., 120, FIG. 1), a product identifier of the DRM (e.g., 130, FIG. 1), an identifier of a client, a type of a client, a type of a file system, computing resource utilization data (or key performance metrics including estimates, measurements, etc.) (e.g., data related to a user's maximum, minimum, and/or average CPU utilizations, an amount of storage or memory resource utilized by a user, an amount of networking resource utilized by user to perform a network operation, etc.) regarding the resources of the DC (e.g., 120, FIG. 1) and/or the DRM (e.g., 130, FIG. 1), a setting of a mission critical application executing on the DC (e.g., 120, FIG. 1) (or on the DRM (e.g., 130, FIG. 1)), a data protection policy (e.g., an SLA, an affinity-based backup policy, a data protection policy that dictates 30 days retention at a data domain, etc.) implemented by a user (e.g., to protect a local data center, to perform a rapid recovery, etc.), a configuration setting of that policy, a size of each of the set of assets protected, a number of each type of a set of data protection policies implemented by an administrator, a deployment configuration (e.g., a multi virtual local area network (VLAN) configuration, an IPv6 configuration, etc.) set (by a user) for the DRM (e.g., 130, FIG. 1), a deployment environment/OS (e.g., a VMware® Cloud (VMC) environment, a Microsoft® Windows OS, a Microsoft® Hyper-V environment, etc.) set (by a user) for the DRM (e.g., 130, FIG. 1), a number of each type of a set of assets protected by the DRM (e.g., 130, FIG. 1), a job detail (e.g., how many data protection policies execute at the same time; based on a configured data protection policy, how many assets are being backed up; a type of a job, such as a data protection job, a data restoration job, a log retention job, etc.), a workflow (e.g., a policy that dictates how a workload should be configured and/or protected, such as an SQL workflow dictates how an SQL workload should be protected) set (by a user) for the DRM (e.g., 130, FIG. 1), etc.

In one or more embodiments, a data protection policy may include (or specify), for example (but not limited to): an RPO with copies of data to be generated at a specific interval, an RTO with mission critical applications restored with low latency storage, performance requirements (e.g., latency requirements, streaming requirements, priority requirements, etc.) need to be followed while backing up data, cost associated to protect data (e.g., cloud cost versus on-premise cost), information regarding to a resource (e.g., a centralized protection policy is configured to protect VM_15, in which VM_15 provides computer-implemented services to a user), a serial number of the DRM (e.g., 130, FIG. 1), a serial number of the DC (e.g., 120, FIG. 1), etc.

In one or more embodiments, application logs may include (or specify), for example (but not limited to): warnings and/or errors (e.g., unknown software exception (0xc00d) occurred in the application at location 0x0007d) occurred in a software component, an identifier (e.g., a name) of an asset, an identifier of a parent folder containing an asset (where the parent folder may be a folder that is one level higher than a current directory of an asset in a file system hierarchy), a size of an asset (where the size of an asset may specify how much storage volume the asset consumes), an offset for data of an asset stored in storage (where the offset for an asset's data may be a pointer that points to one or more blocks of storage that store the data), one or more attributes of an asset (which may specify, for example, Asset A should be read-only, Asset B should be hidden, etc.), an access control list (ACL) of an asset (which may specify a user with a user level of 7 (out of 10) or above can access the asset), a discrete file system activity data that is recorded in an agent (e.g., a timestamp of an activity, an identifier of a user who interacted with an asset, an identifier of a computing device, a timestamp showing when a specific request is processed by an application, etc.), a type of an asset, a number of users interacting with an asset, a number of asset size changes, an identifier of an application, a product identifier of an application, a type of an activity (e.g., asset read, asset created, asset modified, asset renamed, asset copied, asset deleted, asset access denied, asset security changed, asset moved, etc.), a description of an activity, a directory of a source asset, a type of a file system (e.g., NTFS, ReFS, etc.), a version of an application, a version of an OS, a hardware identification number of a client, etc.

In one or more embodiments, system logs may include (or specify), for example (but not limited to): a media access control (MAC) address of a computing device, a type of a computing device, an identifier of an OS executing on a computing device, a network connectivity detail (e.g., a network identifier, a category of the network, etc.) of a client, transition of device states, an alert for medium level of CPU overheating, an alert indicating that a recommended maximum CPU operating temperature is exceeded, important keywords for a hardware component (e.g., recommended maximum CPU operating temperature is 75° C.), a transition from one device state to another device state (e.g., fan failure→overheating of CPU, fan failure→memory module failure, etc.), an alert indicating that a recommended maximum CPU operating temperature is exceeded, a port number, a protocol type associated with a port number, computing resource details and an IP address of the DC (e.g., 120, FIG. 1), a number of hardware components (e.g., fans, CPUs, GPUs, etc.) deployed to the DC (e.g., 120, FIG. 1), a number of hardware components (e.g., fans, CPUs, GPUs, etc.) deployed to the DRM (e.g., 130, FIG. 1), a status of a hardware component operating on the DC (e.g., 120, FIG. 1), a status of a hardware component operating on the DRM (e.g., 130, FIG. 1), etc.

In one or more embodiments of the invention, important keywords and/or alerts for a hardware component or a computing device may be selected/defined by a vendor of the device, by a technical support specialist, by another individual or entity, or any combination thereof. The important keywords and/or alerts may be specific technical terms or vendor specific terms that are used in the system log files.

In one or more embodiments, the collector (202) may monitor service performance and resource utilization of each component of the DC (e.g., 120, FIG. 1) and the DRM (e.g., 130, FIG. 1) (for, for example, troubleshooting and optimization) by obtaining telemetry data about each component's technology stack (e.g., telemetry data about computing resources of each component) from the corresponding device. In one example, the collector (202) may: (i) monitor actions being performed, computation power being consumed, communications being sent or received, etc. by each component, (ii) monitor communications being sent or received by each component by intercepting them as they traverse from one component to another, (iii) based on the intercepted communications, determine utilization rates of one or more resources by a component, and (iv) store (temporarily or permanently) the resource utilization rates (e.g., including estimates, measurements, etc.) in the database (208).

In one or more embodiments, while monitoring, the collector (202) may need to, for example (but not limited to): inventory a component, obtain a type and a model of a component, obtain a version of firmware or other code executing on a component, obtain information regarding a resource that may be allocated to a component, obtain information specifying a component's interaction with one another, etc.

One of ordinary skill will appreciate that the collector (202) may perform other functionalities without departing from the scope of the invention. When providing its functionalities, the collector (202) may perform all, or a portion, of the methods illustrated in FIG. 3.1. The collector (202) may be implemented using hardware, software, or any combination thereof.

In one or more embodiments, the analyzer (204) may include functionality to, e.g.: (i) receive (or obtain) collected/obtained information (e.g., DRM metadata, DC metadata, resource utilization levels, telemetry data, application logs, system logs, alerts triggered at the corresponding device, etc.) from the collector (202) and/or from the database (208); (ii) based on (i) and by employing a set of linear, non-linear, and/or machine learning (ML) models (e.g., a natural language processing (NLP) model), analyze (without the requirement of resource-intensive efforts) the obtained information to extract useful and detailed insights (e.g., relevant data, described below) to infer issues in relation to the DRM (e.g., 130, FIG. 1) and the DC (e.g., 120, FIG. 1) early in the cycle and to notify the corresponding entities (e.g., administrators); (iii) based on relevant data, derive a continuous average resource utilization value for each component of the DC (e.g., 120, FIG. 1) and the DRM (e.g., 130, FIG. 1) with respect to each resource (e.g., a processing resource, a networking resource, etc.); (iv) based on the relevant data, derive a minimum and a maximum resource utilization values for each component of the DC (e.g., 120, FIG. 1) and the DRM (e.g., 130, FIG. 1) with respect to each resource; (v) based on (ii)-(iv), identify (a) which components of the DC (e.g., 120, FIG. 1) and the DRM (e.g., 130, FIG. 1) are healthy (e.g., a component that is operational, an application that executes on a component generates a response to a request, etc.), and (b) which components of the DC (e.g., 120, FIG. 1) and the DRM (e.g., 130, FIG. 1) are unhealthy (e.g., a component that is down, an application that executes on a component does not generate a response to a request, an over-provisioned application, a component is slowing down in terms of performance, a component's resource utilization value is exceeding a predetermined maximum resource utilization value threshold, an application is unhealthy because its status code is 503, etc.); (vi) based on (ii)-(iv), build observability (by employing a set of linear, non-linear, and/or ML models) for each component of the DC (e.g., 120, FIG. 1) and the DRM (e.g., 130, FIG. 1) in order to identify health of each component; (vii) based on (ii)-(iv), obtain a current state of the DRM (e.g., 130, FIG. 1) and a current state of the DC (e.g., 120, FIG. 1); (viii) based on (vii) and by employing a set of linear, non-linear, and/or ML models (e.g., a Markov chain model), infer a future state of the DRM (e.g., 130, FIG. 1) and a future state of the DC (e.g., 120, FIG. 1), (ix) based on the future state of the DRM (e.g., 130, FIG. 1) and the future state of the DC (e.g., 120, FIG. 1), automatically react and generate alerts if (a) the future state of the DRM (e.g., 130, FIG. 1) indicates a failure score of the DRM (e.g., 130, FIG. 1) is greater than or equal to a first predetermined failure score and/or (b) the future state of the DC (e.g., 120, FIG. 1) indicates a failure score of the DC (e.g., 120, FIG. 1) is greater than or equal to a second predetermined failure score; (x) based on relevant data, identify a user profile (e.g., a profile that indicates, at least, how the DC (e.g., 120, FIG. 1) or the DRM (e.g., 130, FIG. 1) has been utilized (by a user), for example, for centralized protection, rapid recovery, cloud tiering, self-service restore, cloud disaster recovery, etc.) of a user; (xi) based on (viii) and (ix), manage health of the DC (e.g., 120, FIG. 1) and the DRM (e.g., 130, FIG. 1); (xii) provide identified health (and related data (e.g., generated alerts, information obtained from the collector (202), output(s) of the above-discussed processes in (i)-(xi), etc.)) of the DC (e.g., 120, FIG. 1) and the DRM (e.g., 130, FIG. 1) to other entities (e.g., the decision engine (206), administrators, etc.), and (xiii) store (temporarily or permanently) the aforementioned data and/or the output(s) of the above-discussed processes in (i)-(xi) in the database (208).

In one or more embodiments, if the models that are used by the analyzer (204) are not operating properly (e.g., are not providing the above-discussed functionalities), the models may be re-trained using any form of training data and/or the models may be updated periodically as there are improvements in the models (e.g., the models are trained using more appropriate training data).

In one or more embodiments, extracted relevant data may include (i) information regarding how the DC (e.g., 120, FIG. 1) has been utilized by the corresponding entity (e.g., a user, another computing device, etc.) and (ii) information regarding how the DRM (e.g., 130, FIG. 1) has been utilized by the corresponding entity, for example (but not limited to): an application log, a system log, an alert, a hardware component trap, an important keyword, a type of a workload utilized by a user of the DC (e.g., 120, FIG. 1), a type of a workload utilized by a user of the DRM (e.g., 130, FIG. 1), an SLA/SLO set/tested by a user, computing resource utilization data regarding the resources of the DC (e.g., 120, FIG. 1) and/or of the DRM (e.g., 130, FIG. 1), a data protection policy implemented/tested by a user, a number of each type of a set of assets protected by the DRM (e.g., 130, FIG. 1), a size of each of the set of assets protected by the DRM (e.g., 130, FIG. 1), a number of each type of a set of data protection policies implemented by a user, a deployment configuration set by a user, a deployment environment set by a user, etc.

One of ordinary skill will appreciate that the analyzer (204) may perform other functionalities without departing from the scope of the invention. When providing its functionalities, the analyzer (204) may perform all, or a portion, of the methods illustrated in FIG. 3.1. The analyzer (204) may be implemented using hardware, software, or any combination thereof.

In one or more embodiments, the decision engine (206) may include functionality to, e.g.: (i) receive (or obtain) identified health (and related data) from the analyzer (204) and/or from the database (208); (ii) based on (i) and by employing a set of linear, non-linear, and/or ML models, make one or more determinations/outputs (see FIG. 3.2) with respect to (a) the health status of the DC (e.g., 120, FIG. 1) and the DRM (e.g., 130, FIG. 1); (b) performance issues occurred in the DC (e.g., 120, FIG. 1) and the DRM (e.g., 130, FIG. 1) (for example, which application was down while processing a specific request, which request caused an application to went down, what is the health of an application and its dependencies, etc.); (iii) based on the performed determinations, provide one or more recommendations to an administrator of the DRM (e.g., 130, FIG. 1) to manage the health of the DRM (e.g., 130, FIG. 1); (iv) based on the performed determinations, provide one or more recommendations to an administrator of the DC (e.g., 120, FIG. 1) to manage the health of the DC (e.g., 120, FIG. 1) and to indicate that the DRM (e.g., 130, FIG. 1) is operational; (v) based on the performed determinations, provide a configuration template (described below) to the DC (e.g., 120, FIG. 1) to initiate generation of one or more virtual DRMs (e.g., 150, FIG. 1); (vi) after one or more virtual DRMs (e.g., 150, FIG. 1) are generated on the fly (by the hypervisor of the DC (e.g., 120, FIG. 1)), provide one or more recommendations to an administrator of the DC (e.g., 120, FIG. 1) to manage the health of the DC (e.g., 120, FIG. 1) and to indicate that the virtual DRMs (e.g., 150, FIG. 1) are operational (so that the virtual DRMs (e.g., 150, FIG. 1) may be used for managing disaster recovery operations for the DC (e.g., 120, FIG. 1) while the DRM (e.g., 130, FIG. 1) is being repaired; (vii) via its recommendation monitoring service, monitor whether a provided recommendation is implemented by an administrator of the corresponding entity (e.g., the DC (e.g., 120, FIG. 1), the DRM (e.g., 130, FIG. 1), etc.); and (viii) store (temporarily or permanently) the aforementioned data and/or the output(s) of the above-discussed processes in (i)-(vii) in the database (208).

In one or more embodiments, the decision engine (206) may generate a configuration template based on the computing resource details of the DRM (e.g., 130, FIG. 1). In one or more embodiments, the configuration template may specify, for example (but not limited to): a minimum user count, a maximum user count, a minimum number of CPUs that needs to be hosted by the DRM, a speed select technology configuration that needs to be implemented by the DRM, a hardware virtualization configuration that needs to be implemented by the DRM, a minimum number of GPUs that needs to be hosted by the DRM, a type of a GPU scheduling policy that needs to be implemented by the DRM, an input/output memory management unit configuration hat needs to be implemented by the DRM, a minimum number of virtual network interface cards (vNICs) that needs to be hosted by the DRM, a network connection configuration (e.g., a wake on LAN support configuration) that needs to be supported by the DRM, a memory configuration (e.g., a swap space configuration, a reserved memory configuration, a memory ballooning configuration, etc.) that needs to be supported by the DRM, a storage mode configuration that needs to be implemented by the DRM, a quality of service (QoS) guarantee configuration that needs to be implemented by the DRM, etc.

One of ordinary skill will appreciate that the decision engine (206) may perform other functionalities without departing from the scope of the invention. When providing its functionalities, the decision engine (206) may perform all, or a portion, of the methods illustrated in FIGS. 3.1-3.3. The decision engine (206) may be implemented using hardware, software, or any combination thereof.

In one or more embodiments, the database (208) may be a fully managed cloud (or local) database (or any logical container) that acts as a shared storage or memory (simply storage/memory) resource that is functional to store unstructured and/or structured data. Further, the database (208) may also occupy a portion of a physical storage/memory device or, alternatively, may span across multiple physical storage/memory devices.

In one or more embodiments, the database (208) may be implemented using physical devices that provide data storage services (e.g., storing data and providing copies of previously stored data). The devices that provide data storage services may include hardware devices and/or logical devices. For example, the database (208) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (208) may include a memory device (e.g., a dual in-line memory device), in which data is stored and from which copies of previously stored data are provided. As yet another example, the database (208) may include a persistent storage device (e.g., an SSD), in which data is stored and from which copies of previously stored data is provided. As yet another example, the database (208) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (208) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (208) may store/record (temporarily or permanently) unstructured and/or structured data that may include (or specify), for example (but not limited to): an application log, a system log, a user type (e.g., a knowledge worker, a power worker, a task worker with relatively low-end compute requirements, a high-end user that requires a rich multimedia experience, etc.), an index of an asset, a backup history documentation of a workload, recently obtained customer/user information (e.g., records, credentials, etc.) of a user, a cumulative history of initiated model training operations (e.g., sessions) over a prolonged period of time, a restore history documentation of a workload, a documentation that indicates a set of jobs (e.g., a data backup job, a data restore job, etc.) that has been generated, a documentation that indicates a status of a job (e.g., how many jobs are still active, how many jobs are completed, etc.), a set of SLAs (e.g., an agreement that indicates a period of time required to retain data available in the database (208)), a cumulative history of initiated data backup operations over a prolonged period of time, a cumulative history of initiated data restore operations over a prolonged period of time, one or more policies/rules/settings for the operation (or configuration) of any component of the DC (e.g., 120, FIG. 1) (or the DRM (e.g., 130, FIG. 1)), recently obtained user/customer activity records (e.g., metadata), a cumulative history of customer activity records obtained over a prolonged period of time, an identifier of a vendor, an identifier of a customer, customer data, a list of instructions, a setting of an application, a display resolution configuration of a client, an amount of storage used by an application, a language setting of an OS, a serial number of a client, a hardware identification number of a hardware component, an identifier of a client's manufacturer, a profile of a valid user, a profile of an invalid user, one or more outputs of the processes performed by the DC (e.g., 120, FIG. 1), one or more outputs of the processes performed by the DRM (e.g., 130, FIG. 1), a workload allocation table, a workload priority ranking, a resource health ranking, information regarding the services that are to be provided to users (where the information may include, for example, identifiers of the users, priority of the users (to determine how to marshal limited computing resources in the system (e.g., 100, FIG. 1)), solution or workaround documents of previous hardware component failures, existing knowledge base (KB) articles (which may include remediation, software version, and/or component information for previous hardware component failures), device user guides, device release notes, videos and/or community forum questions and answers, a post posted by a user, a security fix, a version of a security fix, monitored resource utilization data/value of each application (to generate and store a resource utilization map, which may indicate, for example, the DC's CPU utilization is 26%, the DRM's GPU utilization is 38%, an amount of storage or memory resource utilized by a hardware component of the DRM (e.g., 130, FIG. 1), an amount of networking resource utilized by a hardware component of the DC (e.g., 120, FIG. 1) to perform a network operation (e.g., to publish and coordinate inter-process communications), an amount of bare metal communications (e.g., input/output operations executed by an application per second) executed by an application executing on the DC (e.g., 120, FIG. 1), resource utilization rates over time, power consumption of hardware components of the DC (e.g., 120, FIG. 1) while utilized by a user, a certain file operation performed by a microservice, an identifier of a microservice and a resource that have been allocated to that microservice, workload performance data of a microservice, a resource (e.g., processing, storage/memory, networking, a quantity of file descriptors utilized by a process that is executed by a microservice, a quantity of threads utilized by a process that is executed by a microservice, etc.) utilization rate of a microservice over time, information regarding an operation of a microservice that may be utilized to manage the operation of that microservice, information regarding duplicative data stored by a microservice for data integrity purposes, information regarding redundantly performed workloads by a microservice to meet a user's requirements, information regarding an encryption scheme utilized by a microservice to prevent unauthorized access of data, an amount of storage or memory resource utilized by a microservice, a user posted approximated port activation time, details of a remediative action that is applied to a previous hardware component failure, a catalog file of an application upgrade, details of a compatible OS version for an application upgrade to be installed, an application upgrade sequence, DRM data that reflects a state of the DRM (e.g., 130, FIG. 1), DC data that reflects a state of the DC (e.g., 120, FIG. 1), one or more lists that specify which computer-implemented services should be provided to which user (depending on a user access level of a user), one or more policies/rules for the operation (or configuration) of any component of the management module (200), etc. Based on the aforementioned data, for example, the analyzer (204) may perform user analytics (i) to infer profiles of users communicating with the DC (e.g., 120, FIG. 1) and the DRM (e.g., 130, FIG. 1), and (ii) to infer how badly a request is being processed by the DC (e.g., 120, FIG. 1) and the DRM (e.g., 130, FIG. 1).

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, a newer version of an existing KB article is published, etc.

In one or more embodiments, the database (208) may provide an indexing service (e.g., a registration service). That is, data may be indexed or otherwise associated with registration records (e.g., a registration record may be a data structure that includes information (e.g., an identifier associated with data) that enables the recorded data to be accessed). More specifically, an agent of the database (208) may receive various data protection related inputs directly (or indirectly) from the analyzer (204) (or indirectly from the clients (e.g., 155, FIG. 1)). Upon receiving, the agent may analyze those inputs to generate an index(es) (e.g., a data backup operation index(es)) for optimizing the performance of the database (208) by reducing a required amount of database access(es) when implementing a request (e.g., a data retrieval request). In this manner, requested data may be quickly located and accessed from the database (208) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

Further, in one or more embodiments, an index may include, for example (but not limited to): information about a user associated with a data protection operation, a keyword extracted from a data recovery operation that relates to a type of the recovery (e.g., cloud disaster recovery, rapid recovery, etc.), a tag associated with a data protection operation (e.g., a permanent and self-service data backup from a VM), etc. The index(es) may also include other information that may be used to efficiently identify historical data protection operations. In one or more embodiments, the aforementioned data may be stored as "data protection operation metadata" in the database (208).

In one or more embodiments, the unstructured and/or structured data may be maintained by, for example, the analyzer (204). The analyzer (204) may add, remove, and/or modify those data in the database (208) to cause the information included in the database (208) to reflect the latest version of, for example, SLAs. The unstructured and/or structured data available in the database (208) may be implemented using, for example, lists, tables, unstructured data, structured data, etc. While described as being stored locally, the unstructured and/or structured data may be stored remotely, and may be distributed across any number of devices without departing from the scope of the invention.

While the database (208) has been illustrated and described as including a limited number and type of data, the database (208) may store additional, less, and/or different data without departing from the scope of the invention. In the embodiments described above, the database (208) is demonstrated as part of the management module (200); however, embodiments herein are not limited as such. In one or more embodiments, the database (208) may be a separate entity from the management module (200).

One of ordinary skill will appreciate that the database (208) may perform other functionalities without departing from the scope of the invention. When providing its functionalities, the database (208) may perform all, or a portion, of the methods illustrated in FIGS. 3.1-3.3. The database (208) may be implemented using hardware, software, or any combination thereof.

In one or more embodiments, the collector (202), the analyzer (204), the decision engine (206), and the database (208) may be utilized in isolation and/or in combination to provide the above-discussed functionalities. These functionalities may be invoked using any communication model including, for example, message passing, state sharing, memory sharing, etc. By doing so, the management module (200) may address issues related to data security, integrity, and availability proactively.

FIGS. 3.1-3.3 show a method for managing a DRM in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed management module (e.g., 140, FIG. 1). Other components of the distributed system (100) illustrated in FIG. 1 may also execute all or part of the method shown in FIG. 3.1 without departing from the scope of the invention.

In Step 300, the management module (or more specifically, e.g., the collector (e.g., 202, FIG. 2)) obtains (e.g., gathers) DC metadata associated with one or more components of the DC (e.g., 120, FIG. 1) from the DC (to infer, for example, a change in the health status of the DC (e.g., in real-time)) because of an unexpected event (e.g., fan failure is reported, overheating of CPU is reported, memory module failure is reported, power module failure is reported, a security incident is reported, etc.)).

In one or more embodiments, the collector may make an API call to, for example, storage/memory resources of the DC to obtain the DC metadata stored in the DC. Based on receiving the API call from the collector, the storage/memory resources of the DC may allow the collector to obtain the DC metadata.

In one or more embodiments, the DC metadata may be obtained, for example, by a storage/memory agent of the DC pushing information related to the DC metadata as they become available, or by the analyzer polling the storage/memory agent (e.g., by making an API call to the storage/memory agent) for new information. Based on receiving the API call from the collector, the storage/memory agent may allow the collector to obtain the information.

The DC metadata may be obtained (or streamed) continuously (without affecting production workloads of the DC), as they generated, or they may be obtained in batches, for example, in scenarios where (i) the collector receives a failure score calculation request for the DC, (ii) the DC accumulates the DC metadata and provides them to the collector at fixed time intervals, or (iii) the DC stores the DC metadata in a storage device, and notifies the collector to access the DC metadata from the storage device. In one or more embodiments, the DC metadata may be access-protected for a transmission from the DC to the collector, e.g., using encryption.

In one or more embodiments, as part of the DC metadata, the collector may obtain resource utilization data (e.g., key performance metrics) of the DC's components (e.g., hardware components, software components, etc.) by, for example (but not limited to): monitoring actions being performed, computation power being consumed, communications being sent or received, etc. by each component; monitoring communications being sent or received (by each component) by intercepting them as they traverse from one component to another, determining (based on intercepted communications) utilization rates of one or more resources by a component, etc.

In one or more embodiments, in addition to the DC metadata, the collector may also obtain one or more alerts that are triggered at the DC. For example, based on a failed cloud disaster recovery operation (which is initiated by a user), the DC may generate a failure alert. Thereafter, the collector may store (temporarily or permanently) those alerts and the DC metadata in the database (e.g., 208, FIG. 2). In this manner, the collector may obtain more information regarding, e.g., (i) the operations performed and/or failures occurred in the DC, and (ii) one or more reasons of those failures. Certain exemplary details of the DC, DC metadata, and database have been described above in reference to FIGS. 1 and 2, respectively.

In Step 302, similar to Step 300, the management module (or more specifically, e.g., the collector) obtains DRM metadata associated with one or more components of the DRM (e.g., 130, FIG. 1) from the DRM (to infer, for example, a change in the health status of the DRM (e.g., in real-time)) because of an unexpected event).

In one or more embodiments, the collector may make an API call to, for example, storage/memory resources of the DRM to obtain the DRM metadata stored in the DRM. Based on receiving the API call from the collector, the storage/memory resources of the DRM may allow the collector to obtain the DRM metadata.

In one or more embodiments, the DRM metadata may be obtained, for example, by a storage/memory agent of the DRM pushing information related to the DRM metadata as they become available, or by the analyzer polling the storage/memory agent (e.g., by making an API call to the storage/memory agent) for new information. Based on receiving the API call from the collector, the storage/memory agent may allow the collector to obtain the information.

The DRM metadata may be obtained (or streamed) continuously (without affecting production workloads of the DRM), as they generated, or they may be obtained in batches, for example, in scenarios where (i) the collector receives a failure score calculation request for the DRM, (ii) the DRM accumulates the DRM metadata and provides them to the collector at fixed time intervals, or (iii) the DRM stores the DRM metadata in a storage device, and notifies the collector to access the DRM metadata from the storage device. In one or more embodiments, the DRM metadata may be access-protected for a transmission from the DRM to the collector, e.g., using encryption.

In one or more embodiments, as part of the DRM metadata, the collector may obtain resource utilization data of the DRM's components (e.g., hardware components, software components, etc.) by, for example (but not limited to): monitoring actions being performed, computation power being consumed, communications being sent or received, etc. by each component; monitoring communications being sent or received (by each component) by intercepting them as they traverse from one component to another, determining (based on intercepted communications) utilization rates of one or more resources by a component, etc.

In one or more embodiments, in addition to the DRM metadata, the collector may also obtain one or more alerts that are triggered at the DRM. For example, based on a failed cloud disaster recovery operation (which is initiated by a user), the DRM may generate a failure alert. Thereafter, the collector may store (temporarily or permanently) those alerts and the DRM metadata in the database. In this manner, the collector may obtain more information regarding, e.g., (i) the operations performed and/or failures occurred in the DRM, and (ii) one or more reasons of those failures. Certain exemplary details of the DRM, DRM metadata, and database have been described above in reference to FIGS. 1 and 2, respectively.

In one or more embodiments, to be able to get useful and detailed insights from the DC and the DRM, the management module (or the corresponding administrators of those devices) may rely on telemetry data, in particular, metadata associated with today's modem applications and/or components that are being executed and/or deployed on those devices. As described above, metadata is not only helpful to extract more useful and detailed insights about, for example, the DC, the DRM, and the utilization of those devices, but is also helpful (i) to manage users' device utilization activities for device management and development, and (ii) to manage users' future data growth challenges.

In Step 304, the management module (or more specifically, e.g., the analyzer (e.g., 204, FIG. 2)) obtains collected information (e.g., DRM metadata, DC metadata, resource utilization levels, telemetry data, application logs, system logs, alerts triggered at the corresponding device, etc.) from the collector and/or from the database. Thereafter, by employing a set of linear, non-linear, and/or ML models, the analyzer may proactively analyze (without the requirement of resource-intensive efforts) the obtained information to extract relevant data.

In one or more embodiments, based on the relevant data, the analyzer may, for example (but not limited to): infer issues (e.g., for troubleshooting) in relation to the DRM early in the cycle and notify the corresponding entities (e.g., administrators); infer issues in relation to the DC early in the cycle and notify the corresponding entities; how the "operational state" (e.g., the nominal state) of the DC is transitioned into the "unhealthy state"; how the "operational state" of the DRM is transitioned into the "unhealthy state"; infer the type of data protection operations, workloads, data protection polices, etc. orchestrated by the DRM; obtain input(s) regarding how the DC has been utilized by a user of the DC; obtain input(s) regarding how the DRM has been utilized by a user of the DRM; infer (e.g., in conjunction with the decision engine (e.g., 206, FIG. 2)) what type of fixes need to be implemented at the DC and/or at the DRM for a better device management and user experience; infer (in conjunction with the decision engine) whether or not a user is satisfied with, at least, the performance, reliability, scalability, etc. of the DC; infer (in conjunction with the decision engine) whether or not a user is satisfied with, at least, the performance, reliability, scalability, etc. of the DRM; derive a continuous average resource utilization value for each component of the DC and the DRM with respect to each resource; derive a minimum and a maximum resource utilization values for each component of the DC and the DRM with respect to each resource; etc. Certain exemplary details of the relevant data are described above in reference to FIG. 2.

In one or more embodiments, in order to analyze the DC metadata and DRM metadata, the analyzer may be trained using any form of training data (e.g., previously obtained DC metadata and DRM metadata). In order to train, the above-mentioned models and/or other known or later discovered models may be employed. Further, the analyzer may be updated periodically as there are improvements in the models and/or the models are trained using more appropriate training data. Thereafter, the analyzer may store the relevant data in the database (temporarily or permanently).

In Step 306, based on the relevant data (extracted in Step 304) and by employing a set of linear, non-linear, and/or ML models, the management module (or more specifically, e.g., the analyzer) obtains a current state (e.g., healthy, unhealthy, overheating, critical, warning, normal, etc.) of the DRM. In one or more embodiments, the current state (or the current device state) of the DRM may be a state in which a DRM failure was reported. In one or more embodiments, an unhealthy state (e.g., a compromised health state) may indicate that the DRM has already or is likely to, in the future, be no longer able to provide the computing resources (or services) that it has previously provided (e.g., the DRM is operating outside of its expected operating parameters (which may be defined, for example, by a vendor, a user, any other entity, or any combination thereof)).

In one or more embodiments, a healthy state may correspond to a device state in which the DRM is operating as expected. The health state determination may be made via any method based on aggregated health information without departing from the scope of the invention.

In Step 308, based on the relevant data (extracted in Step 304) and by employing a set of linear, non-linear, and/or ML models, the management module (or more specifically, e.g., the analyzer) obtains a current state of the DC. In one or more embodiments, the current state of the DC may be a state in which a DC failure was reported. In one or more embodiments, an unhealthy state may indicate that the DC has already or is likely to, in the future, be no longer able to provide the computing resources (or services) that it has previously provided. In one or more embodiments, a healthy state may correspond to a device state in which the DC is operating as expected.

In Step 310, based on the current state (and previously obtained/observed states) of the DRM (extracted in Step 306) and by employing a set of linear, non-linear, and/or ML models (e.g., a conformal prediction model, a Markov chain model, etc.), the management module (or more specifically, e.g., the analyzer) infers a future state (e.g., a predicted normal state, a predicted failure state, future device state, etc.) of the DRM. In one or more embodiments, among a list of failure states, the predicted failure state may have the highest likelihood to become the predicted failure.

For example, based on the aforementioned data and method (e.g., based on heuristic information regarding previously observed relationships between health information and future outcomes), the analyzer may infer the future state of the DRM as "overheating of DRM's GPU (operational DRM (previous state)→DRM fan failure (current state) →overheating of DRM's GPU (inferred future state)). The aforementioned example is not intended to limit the scope of the invention.

In one or more embodiments, the analyzer may obtain a confidence score (e.g., a prediction quality) of the inferred future state of the DRM. For example, based on the inferred future state and by employing the conformal prediction model, "overheating of DRM's GPU" may be determined as the correct future state with 80% confidence score. The aforementioned example is not intended to limit the scope of the invention.

In Step 312, based on the current state (and previously obtained/observed states) of the DC (extracted in Step 308) and by employing a set of linear, non-linear, and/or ML models, the management module (or more specifically, e.g., the analyzer) infers a future state of the DC. In one or more embodiments, among a list of failure states, the predicted failure state may have the highest likelihood to become the predicted failure.

For example, based on the aforementioned data and method (e.g., based on heuristic information regarding previously observed relationships between health information and future outcomes), the analyzer may infer the future state of the DC as "overheating of DC's DPU (operational DC (previous state)→DC fan failure (current state)→overheating of DC's DPU (inferred future state)). The aforementioned example is not intended to limit the scope of the invention.

In one or more embodiments, the analyzer may obtain a confidence score of the inferred future state of the DC. For example, based on the inferred future state and by employing the conformal prediction model, "overheating of DC's DPU" may be determined as the correct future state with 75% confidence score. The aforementioned example is not intended to limit the scope of the invention.

In one or more embodiments, with the help of the aforementioned data (including or specifying, at least, (a) relevant data and (b) obtained "current state" data and "future state" data), users and/or the analyzer may, e.g.: (i) monitor each iteration performed by the DC and/or the DRM to conduct performance tracking by observing/detecting, for example, a reason(s) (e.g., Application K's 503 service is unavailable, fan failure is reported, connection time out is reported, data is not available in the database, etc.) that is causing a component of the DC or the DRM to slow down (or crash), (ii) ascertain how a request travels through multiple applications (e.g., one microservice to the next), particularly when users do not have enough insight with respect to an implementation of the applications that are called, (iii) infer dependencies among applications (e.g., which applications are working together) executing on the DRM and/or executing on the DC, (iv) ascertain what is the health of the DC and/or a change in the health state of the DC (e.g., users may identify a root cause of a hardware component failure (occurred in the DC) using a device state chain (e.g., the collation and correlation of the past, present, and future device state paths)), and (v) ascertain what is the health of the DRM and/or a change in the health state of the DRM (e.g., users may identify a root cause of a hardware component failure (occurred in the DRM) using a device state chain).

In one or more embodiments, in order to generate a device state chain, the analyzer may, e.g.: (i) when a hardware component failure (e.g., a fan failure) is reported, generate a device state path (e.g., for the DRM) from a healthy device state to an unhealthy device state (to understand how the failure has occurred because there may be a strong correlation between the device state path and a root cause of the failure), (ii) predict a future device state of the DRM (see Step 310) based on a current device state of the DRM (see Step 306), and (iii) generate the device state chain using the device state path (which corresponds to the device states up to the current device state), current device state, and future device state. As indicated, while generating the device state chain, not just the previous device state is considered, but the whole device state path is considered.

In one or more embodiments, for example, the predicted future state and generated device state chain of the DRM may be stored in the database. Further, in addition to the information of a hardware component (which reported the hardware component failure), the type of the hardware component failure and the severity of the failure may also be stored/recorded in the database. For example, the DRM reports a critical printed circuit board failure. The type of the failure is recorded as aging of battery and the device state path for the DRM is obtained as printed circuit board failure→system crash. In another example, the DC reports a critical fan failure. The type of the failure is recorded as dust and the device state path for the DC is obtained as fan failure→overheating of CPU→CPU failure→system crash.

As yet another example, assume here that when a hardware component failure (e.g., CPU failure, memory module failure, etc.) has occurred, to be able to create a device state chain, a device state path (e.g., including a previous device state (device state A)) may be obtained from the database and a next device state (e.g., device state C) may be predicted by the Markov chain model. In this example, the device state chain may be generated as A→B (where B is a current state of the device) and B→C, where A represents the fan failure, B represents the overheating of CPU, and C represents the CPU failure. The probability of A→B in the device state chain may be calculated as 0.2 by implementing the Markov chain model in reverse. The probability of B→C in the device state chain may be calculated as 0.3 by performing the Markov chain model. Overall, in this example, the probability of the device state chain may be calculated as 0.06.

In another example, the device state chain may be generated as A→B and B→E (e.g., another probable next device state), where A represents the fan failure, B represents the overheating of CPU, and E represents the storage device failure. The probability of A→B in the device state chain may be calculated as 0.2 by performing the Markov chain model in reverse. The probability of B→E in the device state chain may be calculated as 0.1 by performing the Markov chain model. Overall, in this example, the probability of the device state chain may be calculated as 0.02.

Thereafter, a root cause of the hardware component failure may be identified using the above-generated device state chains. To this end, "A→B→C" device state chain may be considered to provide solutions, because the probability of A→B→C device state chain, in terms of the root cause of the hardware component failure, is higher than the probability of "A→B→E" device state chain. This approach may provide more in-depth information regarding the root cause of the hardware component failure, because considering only the problematic device state may be not sufficient to identify the root cause.

In one or more embodiments, (i) after generating a device state chain for the DC and for the DRM and (ii) by employing a set of linear, non-linear, and/or ML models (e.g., a multiple linear regression model that includes weighted parameters/coefficients), the analyzer may derive a failure score of the DC and the DRM. In one or more embodiments, depending on the situation, an administrator may send a request to the analyzer so that the coefficients may be adjusted to operate inversely. Further, the administrator may re-fit the regression model when new data becomes available because of a particular user or a use case.

In one or more embodiments, for example, based on the identified health of the DRM (and/or based on the failure score of the DRM), the analyzer may tag each component of the DRM accordingly. In order to tag a component based on its identified health, the analyzer, for example: (i) may employ a set of linear, non-linear, and/or ML models, or (ii) may include one or more configuration instructions. By employing a model or based on configuration instructions, the analyzer may, for example (but not limited to): tag CPU A as a "LOW" performing CPU, tag fan H as a "HIGH" performing fan, etc.

As yet another example, based on the future state of the DRM (or based on the identified health of the DRM), the analyzer may automatically react and generate alerts if the future state of the DRM indicates a failure score of the DRM is greater than or equal to a first predetermined failure score. In one or more embodiments, an alert may specify, for example (but not limited to): a maximum level of GPU overheating is detected, a recommended maximum GPU operating temperature is exceeded, etc.

In one or more embodiments, the analyzer may provide the device state chains of the DC and the DRM, identified health of the DC and the DRM, and related information (e.g., generated alerts, information obtained from the collector, tagging information, failure scores, etc.) to the decision engine. The analyzer may also store (temporarily or permanently) the aforementioned data in the database. In this manner, for example, performance of the DRM and the DC may be tracked over time.

Turning now to FIG. 3.2, the method shown in FIG. 3.2 may be executed by, for example, the above-discussed management module. Other components of the system (100) illustrated in FIG. 1 may also execute all or part of the method shown in FIG. 3.2 without departing from the scope of the invention.

In Step 314, upon receiving the device state chains of the DC and the DRM, identified health of the DC and the DRM, and related information from the analyzer, the decision engine makes a first determination as to whether the failure score of the DRM is greater than or equal to the first predetermined failure score. Accordingly, in one or more embodiments, if the result of the first determination is YES (meaning that the DRM is unhealthy (e.g., slowing down in terms of performance, likely to fail, not generating a response to a request, over-provisioned, its CPU is exceeding the predetermined maximum resource utilization value threshold, its GPU operating temperature is above the recommended maximum GPU operating temperature threshold, operational state of the DRM is not associated with the ability of the DRM to perform its functionalities, etc.)), the method proceeds to Step 316. If the result of the first determination is NO (meaning that the DRM is healthy (e.g., providing a consistent performance, generating a response to a request, its CPU is operating without exceeding a predetermined maximum resource utilization value threshold, its GPU operating temperature is below the recommended maximum GPU operating temperature threshold etc.)), the method alternatively proceeds to Step 320.

In Step 316, as a result of the first determination in Step 314 being YES, the decision engine makes a second determination as to whether the failure score of the DC is greater than or equal to a second predetermined failure score. Accordingly, in one or more embodiments, if the result of the second determination is NO (meaning that the DC is healthy), the method proceeds to Step 318. If the result of the second determination is YES (meaning that the DC is unhealthy), the method alternatively proceeds to Step 324 of FIG. 3.3.

In Step 318, as a result of the second determination in Step 316 being NO, the decision engine takes one or more preventive (and proactive) actions. In this manner, in one or more embodiments, the decision engine may send a recommendation (e.g., a request, a command, etc.) (or multiple recommendations with minimum amount of latency) to an administrator of the DRM to, at least: (i) manage the health of the DRM (e.g., if necessary, the administrator may contact with a technical support person to resolve the condition of the DRM), (ii) engage with the DRM to provide a better user experience, (iii) modify resource utilization levels of the components of the DRM, (iv) suggest (or convince) the administrator of the DRM about increasing (or decreasing) the resource utilization level of a DRM component (without leveraging against the best practice recommended by the corresponding vendor), (v) develop and provide a better DRM (with respect to functionality, scalability, reliability, etc.), (vi) initiate dispatching of a healthy DRM to the CE (e.g., 110, FIG. 1) to replace the unhealthy DRM under a product warranty and to enhance resilience of the CE, (vii) perform workload redistribution among the components of the DRM to manage the overall operation of the DRM, (viii) to reduce the quantity of unnecessary REST API calls that the DRM was responsible for (so that, for example, unnecessary memory utilization of a DRM component may be prevented), (ix) modify a predetermined maximum resource utilization value threshold assigned to the DRM (so that the DRM may take more workloads without choking), and (x) make the DRM more user-friendly (e.g., easy to engage with), easy to use, highly automated, and successful in operation.

In one or more embodiments, the administrator of the DRM may receive, via a GUI of the DRM, the recommendation (e.g., "please replace GPU B with another GPU", "please upgrade the version of Application T from version 1.2 to version 1.4 and then restart the DRM", "please configure extra storage space for Application P for a better user experience", "please implement Security Model R", "please implement Communication Model C", "please request/obtain a second DRM from the vendor in order to reduce the number of VMs protected with your current DRM", "please split your workloads into additional DRMs for a smoother user experience", etc.) as pre-loaded instructions (present in the database) and/or via other methods. Further, via its recommendation monitoring service, the decision engine may monitor whether the provided recommendation is implemented by the administrator of the DRM. The recommendation monitoring service may be designed and configured to facilitate remote access to check whether the health of the DRM has been managed. Based on monitoring, if the administrator did not take an action, the decision engine may resend the recommendation to the administrator. Separately, based on monitoring, if the health of the DRM could not be managed even after implementing the provided recommendation (e.g., the DRM could not transition from the compromised state back to a nominal state), the decision engine may provide a second recommendation to the administrator.

In one or more embodiments, once the "unhealthy" state of the DRM is fixed (e.g., after the health of the DRM has been managed), the decision engine may initiate notification of the administrator about the current health status of the DRM. The notification may be displayed on a GUI of, for example, the DRM. Thereafter, the decision engine may store (temporarily or permanently) the recommendation(s) in the database. The method may then end.

In Step 320, as a result of the first determination in Step 314 being NO, the decision engine makes a third determination as to whether the failure score of the DC is greater than or equal to the second predetermined failure score. Accordingly, in one or more embodiments, if the result of the third determination is NO (meaning that the DC is healthy), the method ends. If the result of the third determination is YES (meaning that the DC is unhealthy), the method alternatively proceeds to Step 322.

In Step 322, as a result of the third determination in Step 320 being YES, the decision engine takes one or more preventive (and proactive) actions. In this manner, in one or more embodiments, the decision engine may send a recommendation (or multiple recommendations with minimum amount of latency) to an administrator of the DC to, at least: (i) manage the health of the DC (e.g., if necessary, the administrator may contact with a technical support person to resolve the condition of the DC) and to indicate that the DRM is operational, (ii) engage with the DC to provide a better user experience, (iii) modify resource utilization levels of the components of the DC, (iv) suggest (or convince) the administrator of the DC about increasing (or decreasing) the resource utilization level of a DC component (without leveraging against the best practice recommended by the corresponding vendor), (v) develop and provide a better DC (with respect to functionality, scalability, reliability, etc.), (vi) initiate dispatching of a healthy DC to the to replace the unhealthy DC under a product warranty and to enhance resilience of the CE, (vii) perform workload redistribution among the components of the DC to manage the overall operation of the DC, (viii) to reduce the quantity of unnecessary REST API calls that the DC was responsible for (so that, for example, unnecessary memory utilization of a DC component may be prevented), (ix) modify a predetermined maximum resource utilization value threshold assigned to the DC (so that the DC may take more workloads without choking), and (x) make the DC more user-friendly (e.g., easy to engage with), easy to use, highly automated, and successful in operation.

In one or more embodiments, the administrator of the DC may receive, via a GUI of the DC, the recommendation (e.g., "please replace GPU F with another GPU", "please upgrade the version of Application U from version 1.2 to version 1.4 and then restart the DC", "please configure extra storage space for Application P for a better user experience", "please implement Security Model R", "please implement Communication Model C", "please split your workloads into additional DCs for a smoother user experience", etc.) as pre-loaded instructions (present in the database) and/or via other methods. Further, via its recommendation monitoring service, the decision engine may monitor whether the provided recommendation is implemented by the administrator of the DC. The recommendation monitoring service may be designed and configured to facilitate remote access to check whether the health of the DC has been managed. Based on monitoring, if the administrator did not take an action, the decision engine may resend the recommendation to the administrator. Separately, based on monitoring, if the health of the DC could not be managed even after implementing the provided recommendation (e.g., the DC could not transition from the compromised state back to a nominal state), the decision engine may provide a second recommendation to the administrator.

In one or more embodiments, once the "unhealthy" state of the DC is fixed (e.g., after the health of the DC has been managed), the decision engine may initiate notification of the administrator about the current health status of the DC. The notification may be displayed on a GUI of, for example, the DC. Thereafter, the decision engine may store (temporarily or permanently) the recommendation(s) in the database. The method may then end.

Turning now to FIG. 3.3, the method shown in FIG. 3.3 may be executed by, for example, the above-discussed management module. Other components of the system (100) illustrated in FIG. 1 may also execute all or part of the method shown in FIG. 3.3 without departing from the scope of the invention.

In Step 324, as a result of the second determination in Step 316 of FIG. 3.2 being YES, the decision engine takes one or more preventive (and proactive) actions. In this manner, in one or more embodiments, the decision engine may send a recommendation (or multiple recommendations with minimum amount of latency) to the administrator of the DRM to, at least: (i) manage the health of the DRM, (ii) engage with the DRM to provide a better user experience, (iii) modify resource utilization levels of the components of the DRM, (iv) suggest (or convince) the administrator of the DRM about increasing (or decreasing) the resource utilization level of a DRM component (without leveraging against the best practice recommended by the corresponding vendor), (v) develop and provide a better DRM (with respect to functionality, scalability, reliability, etc.), (vi) initiate dispatching of a healthy DRM to the CE to replace the unhealthy DRM under a product warranty and to enhance resilience of the CE, (vii) perform workload redistribution among the components of the DRM to manage the overall operation of the DRM, (viii) to reduce the quantity of unnecessary REST API calls that the DRM was responsible for (so that, for example, unnecessary memory utilization of a DRM component may be prevented), (ix) modify a predetermined maximum resource utilization value threshold assigned to the DRM (so that the DRM may take more workloads without choking), and (x) make the DRM more user-friendly (e.g., easy to engage with), easy to use, highly automated, and successful in operation.

In one or more embodiments, the administrator of the DRM may receive, via a GUI of the DRM, the recommendation (e.g., "please replace GPU B with another GPU", "please upgrade the version of Application T from version 1.2 to version 1.4 and then restart the DRM", "please configure extra storage space for Application P for a better user experience", "please implement Security Model R", "please implement Communication Model C", "please request/obtain a second DRM from the vendor in order to reduce the number of VMs protected with your current DRM", "please split your workloads into additional DRMs for a smoother user experience", etc.) as pre-loaded instructions (present in the database) and/or via other methods. Further, via its recommendation monitoring service, the decision engine may monitor whether the provided recommendation is implemented by the administrator of the DRM. The recommendation monitoring service may be designed and configured to facilitate remote access to check whether the health of the DRM has been managed. Based on monitoring, if the administrator did not take an action, the decision engine may resend the recommendation to the administrator. Separately, based on monitoring, if the health of the DRM could not be managed even after implementing the provided recommendation (e.g., the DRM could not transition from the compromised state back to a nominal state), the decision engine may provide a second recommendation to the administrator.

In one or more embodiments, once the "unhealthy" state of the DRM is fixed (e.g., after the health of the DRM has been managed), the decision engine may initiate notification of the administrator about the current health status of the DRM. The notification may be displayed on a GUI of, for example, the DRM. Thereafter, the decision engine may store (temporarily or permanently) the recommendation(s) in the database.

In Step 326, while the DRM is being repaired/restored, the decision engine sends a configuration template to the DC to initiate generation of one or more virtual DRMs (e.g., 150, FIG. 1) based on the configuration template, in which the configuration template may specify computing resource details of the DRM when the DRM was operational.

In one or more embodiments, once a virtual DRM is generated (by the hypervisor of the DC), the virtual DRM may be used for managing disaster recovery operations for the DC while the DRM is being repaired. Certain exemplary details of the configuration template are described above in reference to FIG. 2.

In Step 328, after one or more virtual DRMs are generated by the DC, the decision engine takes one or more preventive (and proactive) actions. In this manner, in one or more embodiments, the decision engine may send a recommendation (or multiple recommendations with minimum amount of latency) to the administrator of the DC to, at least: (i) manage the health of the DC (e.g., if necessary, the administrator may contact with a technical support person to resolve the condition of the DC) and to indicate that one or more DRMs are ready to use, (ii) engage with the DC to provide a better user experience, (iii) modify resource utilization levels of the components of the DC, (iv) suggest (or convince) the administrator of the DC about increasing (or decreasing) the resource utilization level of a DC component (without leveraging against the best practice recommended by the corresponding vendor), (v) develop and provide a better DC (with respect to functionality, scalability, reliability, etc.), (vi) initiate dispatching of a healthy DC to the to replace the unhealthy DC under a product warranty and to enhance resilience of the CE, (vii) perform workload redistribution among the components of the DC to manage the overall operation of the DC, (viii) to reduce the quantity of unnecessary REST API calls that the DC was responsible for (so that, for example, unnecessary memory utilization of a DC component may be prevented), (ix) modify a predetermined maximum resource utilization value threshold assigned to the DC (so that the DC may take more workloads without choking), and (x) make the DC more user-friendly (e.g., easy to engage with), easy to use, highly automated, and successful in operation.

In one or more embodiments, the administrator of the DC may receive, via a GUI of the DC, the recommendation (e.g., "please replace GPU F with another GPU", "please upgrade the version of Application U from version 1.2 to version 1.4 and then restart the DC", "please configure extra storage space for Application P for a better user experience", "please implement Security Model R", "please implement Communication Model C", "please split your workloads into additional DCs for a smoother user experience", etc.) as preloaded instructions (present in the database) and/or via other methods. Further, via its recommendation monitoring service, the decision engine may monitor whether the provided recommendation is implemented by the administrator of the DC. The recommendation monitoring service may be designed and configured to facilitate remote access to check whether the health of the DC has been managed. Based on monitoring, if the administrator did not take an action, the decision engine may resend the recommendation to the administrator. Separately, based on monitoring, if the health of the DC could not be managed even after implementing the provided recommendation (e.g., the DC could not transition from the compromised state back to a nominal state), the decision engine may provide a second recommendation to the administrator.

In one or more embodiments, once the "unhealthy" state of the DC is fixed (e.g., after the health of the DC has been managed), the decision engine may initiate notification of the administrator about the current health status of the DC. The notification may be displayed on a GUI of, for example, the DC. Thereafter, the decision engine may store (temporarily or permanently) the recommendation(s) in the database. The method may then end.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a disaster recovery module (DRM), the method comprising:

obtaining data center (DC) metadata from a DC, wherein the DC metadata comprises at least first product configuration information (PCI);

obtaining DRM metadata from the DRM, wherein the DRM metadata comprises at least second PCI;

analyzing the DC metadata and the DRM metadata to extract relevant data;

making, based on the relevant data and a first device state chain, a first determination that a failure score of the DRM is greater than a first predetermined failure score, wherein the first determination indicates that the DRM is unhealthy;

making, based on the first determination, the relevant data, and a second device state chain, a second determination that a failure score of the DC is greater than a second predetermined failure score, wherein the second determination indicates that the DC is unhealthy;

following the second determination:

sending a first recommendation to a first administrator of the DRM to manage health of the DRM;

sending a configuration template to the DC to initiate generation of a virtual DRM based on the configuration template, wherein the configuration template is generated based on a third PCI associated with the DRM when the DRM was operational, wherein the third PCI was obtained prior to obtaining the second PCI, wherein after the virtual DRM is generated, the virtual DRM is used for managing disaster recovery for the DC while the DRM is being repaired; and sending, after the virtual DRM is generated, a second recommendation to a second administrator of the DC to manage the health of the DC, wherein the second recommendation specifies that the virtual DRM is operational.

2. The method of claim 1, further comprising:

obtaining a current state of the DRM based on the relevant data;

inferring a future state of the DRM based on the current state of the DRM; and generating the first device state chain using at least the current state of the DRM and the future state of the DRM.

3. The method of claim 2, further comprising:

obtaining a current state of the DC based on the relevant data;

inferring a future state of the DC based on the current state of the DC; and generating the second device state chain using at least the current state of the DC and the future state of the DC.

4. The method of claim 1, wherein the relevant data specifies at least one selected from a group consisting of an application log, a system log, an alert, a hardware component trap, and an important keyword.

5. The method of claim 1, wherein the configuration template specifies at least a minimum computing resource requirement.

6. The method of claim 5, wherein the minimum computing resource requirement specifies at least one selected from a group consisting of a processing resource, a storage resource, a virtualization resource, and a networking resource.

7. The method of claim 1, wherein the configuration template specifies at least a port number and a protocol type associated with the port number.

8. The method of claim 1, wherein the first product configuration information specifies at least one selected from a group consisting of a type of each of a plurality of assets, a number of each type of the plurality of assets, a size of each of the plurality of assets, a type of an operating system, a number of each type of a plurality of data protection policies, an application logs, a system log, an alert, and a hardware component trap.

9. The method of claim 1, wherein the first recommendation specifies that a hardware component of the DRM needs to be replaced with a second hardware component.

10. The method of claim 1, wherein the second recommendation further specifies that an application upgrade for an application executing on a hardware component of the DC needs to performed.

11. A method for managing a disaster recovery module (DRM), the method comprising:

obtaining data center (DC) metadata from a DC, wherein the DC metadata comprises at least first product configuration information (PCI);

obtaining DRM metadata from the DRM, wherein the DRM metadata comprises at least second PCI;

analyzing the DC metadata and the DRM metadata to extract relevant data, wherein the relevant data specifies at least one selected from a group consisting of an application log, a system log, an alert, a hardware component trap, and an important keyword;

making, based on the relevant data and a first device state chain, a first determination that a failure score of the DRM is greater than a first predetermined failure score, wherein the first determination indicates that the DRM is unhealthy;

making, based on the first determination, the relevant data, and a second device state chain, a second determination that a failure score of the DC is greater than a second predetermined failure score, wherein the second determination indicates that the DC is unhealthy;

following the second determination:

sending a first recommendation to a first administrator of the DRM to manage health of the DRM;

sending a configuration template to the DC to initiate generation of a virtual DRM based on the configuration template, wherein the configuration template is generated based on a third PCI associated with the DRM when the DRM was operational, wherein the third PCI was obtained prior to obtaining the second PCI, wherein after the virtual DRM is generated, the virtual DRM is used for managing disaster recovery for the DC while the DRM is being repaired.

12. The method of claim 11, further comprising:

obtaining a current state of the DRM based on the relevant data;

inferring a future state of the DRM based on the current state of the DRM;

generating the first device state chain using at least the current state of the DRM and the future state of the DRM;

obtaining a current state of the DC based on the relevant data;

inferring a future state of the DC based on the current state of the DC; and generating the second device state chain using at least the current state of the DC and the future state of the DC.

13. The method of claim 11, wherein the configuration template specifies at least a minimum computing resource requirement, and wherein the minimum computing resource requirement specifies at least one selected from a group consisting of a processing resource, a storage resource, a virtualization resource, and a networking resource.

14. The method of claim 11, wherein the first recommendation specifies that a hardware component of the DRM needs to be replaced with a second hardware component, and wherein the second recommendation further specifies that an application upgrade for an application executing on a hardware component of the DC needs to performed.

15. A method for managing a disaster recovery module (DRM), the method comprising:

obtaining data center (DC) metadata from an integrated circuitry of a DC, wherein the DC metadata comprises at least first product configuration information (PCI);

obtaining DRM metadata from the DRM, wherein the DRM metadata comprises at least second PCI;

analyzing the DC metadata and the DRM metadata to extract relevant data;

making, based on the relevant data and a first device state chain, a first determination that a failure score of the DRM is greater than a first predetermined failure score, wherein the first determination indicates that the DRM is unhealthy;

making, based on the first determination, the relevant data, and a second device state chain, a second determination that a failure score of the DC is less than a second predetermined failure score, wherein the second determination indicates that the DC is healthy; and sending, based on the second determination, a recommendation to an administrator of the DRM using a graphical user interface of the DRM to manage health of the DRM, wherein the DC and the DRM are operatively connected to each other over a combination of wired and wireless connections.

16. The method of claim 15, further comprising:

obtaining a current state of the DRM based on the relevant data;

inferring a future state of the DRM based on the current state of the DRM;

generating the first device state chain using at least the current state of the DRM and the future state of the DRM;

obtaining a current state of the DC based on the relevant data;

inferring a future state of the DC based on the current state of the DC; and generating the second device state chain using at least the current state of the DC and the future state of the DC.

17. The method of claim 16, wherein the relevant data specifies at least one selected from a group consisting of an application log, a system log, an alert, a hardware component trap, and an important keyword.

18. The method of claim 15, wherein the configuration template specifies at least a minimum computing resource requirement, and wherein the minimum computing resource requirement specifies at least one selected from a group consisting of a processing resource, a storage resource, a virtualization resource, and a networking resource.

19. The method of claim 15, wherein the recommendation specifies that a hardware component of the DRM needs to be replaced with a second hardware component.

20. The method of claim 15, wherein the recommendation specifies that an application upgrade for an application executing on a hardware component of the DRM needs to performed.

* * * * *